US009060084B2

(12) United States Patent
Kaminaka

(10) Patent No.: US 9,060,084 B2
(45) Date of Patent: Jun. 16, 2015

(54) IMAGE FORMING APPARATUS FOR STORING AND LINKING JOBS INPUT THERETO

(71) Applicant: Jumpei Kaminaka, Hachioji (JP)

(72) Inventor: Jumpei Kaminaka, Hachioji (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 72 days.

(21) Appl. No.: 13/650,361

(22) Filed: Oct. 12, 2012

(65) Prior Publication Data

US 2013/0094058 A1 Apr. 18, 2013

(30) Foreign Application Priority Data

Oct. 14, 2011 (JP) .................................. 2011-226353

(51) Int. Cl.
*G06F 3/12* (2006.01)
*H04N 1/00* (2006.01)
*H04N 1/32* (2006.01)

(52) U.S. Cl.
CPC .... *H04N 1/00424* (2013.01); *H04N 2201/3212* (2013.01); *H04N 1/00411* (2013.01); *H04N 1/00432* (2013.01); *H04N 1/00435* (2013.01); *H04N 1/00472* (2013.01); *H04N 1/00474* (2013.01); *H04N 1/00477* (2013.01); *H04N 1/00482* (2013.01); *H04N 1/00957* (2013.01); *H04N 1/32122* (2013.01); *H04N 2201/0094* (2013.01); *H04N 2201/3221* (2013.01)

(58) Field of Classification Search
None
See application file for complete search history.

(56) References Cited

U.S. PATENT DOCUMENTS 8,126,945 B2 2/2012 Ito

FOREIGN PATENT DOCUMENTS

| JP | 2006-053784 A | 2/2006 |
| JP | 2007-086970 A | 4/2007 |
| JP | 2008-197805 A | 8/2008 |

OTHER PUBLICATIONS

Japanese Office Action dated Oct. 22, 2013 (and English translation thereof) in counterpart Japanese Application No. 2011-226353.

*Primary Examiner* — Paul F Payer
(74) *Attorney, Agent, or Firm* — Holtz, Holtz, Goodman & Chick PC

(57) ABSTRACT

Provided is an image forming apparatus. The apparatus includes: a job input unit inputting a job; a job storage storing the job input by the job input unit; a link setting unit linking a new job input from the job input unit and the stored job stored in the job storage, or linking each independent job stored in the job storage; a storage section storing link information indicating the link of jobs set by the ink setting unit; a control section executing predetermined processes based on the link information stored in the storage section; and a print section printing the job.

11 Claims, 21 Drawing Sheets

FIG. 4

| | MACHINE STATUS | JOB LIST | HDD READING | COPY | SCAN | COPY COUNTER | 0 | MEMORY SPACE | 98.000% | | |
|---|---|---|---|---|---|---|---|---|---|---|---|
| | READY TO COPY | | | | | RESERVATION JOB | 0 | FILE SYSTEM SPACE | 96.000% | | |

311

COPIES: 0001

| DOCUMENT SETTING | QUALITY | ZOOM | DUPLEX/COMBINE | APPLICATION | FINISHING |
|---|---|---|---|---|---|
| A ☐ | | 1.000 | 2-SIDED → 2-SIDED | | |
| CONTINUOUS READING | | − + | 2-SIDED → 1-SIDED | | |
| DOCUMENT ORIENTATION | | FULL SIZE | 1-SIDED → 2-SIDED | | |
| ▲ ▼ A UPWARD | | 4.000 2.000 AUTO | 1-SIDED → 1-SIDED | | |

PAPER

| TRAY | SIZE | TYPE | BASIS WEIGHT | STOCK |
|---|---|---|---|---|
| 1 | B4 | PLAIN | 64-74g/m² | ≡ |
| 2 | A4 | PLAIN | 81-105g/m² | ≡ |
| 3 | A4 | PLAIN | 64-74g/m² | ≡ |
| 4 | 8.5×11 | PLAIN | 64-74g/m² | — |
| 5 | 8.5×11 | PLAIN | 64-74g/m² | ≡ |
| 6 | 12×18 | PLAIN | 64-74g/m² | ⇨ |

AUTO ROTATE OFF

TRAY1  TRAY4
TRAY2  TRAY5
TRAY3  TRAY6

311c

| COLOR | | | |
|---|---|---|---|
| SINGLE COLOR | | CHANGE TRAY SETTINGS | AUTO |
| BLACK | | | |
| FULL COLOR | | | |
| AUTO COLOR | | | |

311a  LINK  TEMPORARY-STORE

☐ PRINT DATA RECEIVABLE    MATERIALS   IMAGE ROTATE

| JOB ID | STATUS | LINKED JOB | | | | | |
|---|---|---|---|---|---|---|---|
| | | 1 | 2 | 3 | 4 | 5 | ... |
| 1 | PRINTED | 3 | 7 | 8 | | | |
| 2 | PRINTED | 4 | | | | | |
| 3 | | 1 | 7 | 8 | | | |
| 4 | | 2 | | | | | |
| 5 | | | | | | | |
| 6 | PRINTED | | | | | | |
| 7 | | 1 | 3 | 8 | | | |
| 8 | | 1 | 3 | 7 | | | |

IMAGE FORMING APPARATUS FOR STORING AND LINKING JOBS INPUT THERETO

CROSS-REFERENCE TO RELATED APPLICATION

The present U.S. patent application claims a priority under the Paris Convention of Japanese patent application NO. 2011-226353 filed on Oct. 14, 2011, which shall be a basis of correction of an incorrect translation, and be incorporated by reference herein.

BACKGROUND OF THE INVENTION

Technical Field

The present invention relates to an image forming apparatus.

RELATED ART

Heretofore, an image forming apparatus having a removable general fixing unit and a removable envelope fixing unit is known. The general fixing unit is used for printing on a general sheet of paper which is different from an envelope. The envelope fixing unit is used for printing on an envelope.

When printing on envelopes, it is assumed that printing of documents enclosed in the envelopes is also needed. When performing a set of printing envelopes and printing documents therein, replacing of envelope fixing unit and general fixing unit are needed. For this reason, two jobs are needed for performing the set of printings: an envelope job for printing on envelopes; and a content job for printing of documents on sheets which are different from the envelopes and inserted in the envelopes. User of the image forming apparatus has to understand progress statuses of the envelope job and the content job.

Japanese Patent Application Laid-Open Publication No. 2006-53784 discloses an image forming apparatus which outputs a job end sheet on which a thumbnail image of an printing image printed by a job when the job ends, thereby the user of the apparatus can easily know that the job ends.

Generally, when using an image forming apparatus having a removable fixing unit, generally, one printing job is performed by a fixing unit which is already attached; the fixing unit is replaced by another fixing unit after finishing the job; and remaining printing job is performed with the replaced fixing unit. When performing a set of job printings which needs a number of jobs, such as envelope job and content job, and needs replacing of fixing units, one job is performed between the other jobs and replacing of fixing units is performed between the jobs. The use of the image forming apparatus of Japanese Patent Application Laid-Open Publication No. 2006-53784 can not easily understand each progress status of each job of the set of printings in detail.

Moreover, in case of combining a plurality of jobs into one job, such as job combination or build job, printing conditions of jobs are integrated in one printing condition and thereby original printing conditions are not retained.

SUMMARY OF THE INVENTION

An object of the present invention is to control a plurality of jobs as linked jobs easily.

A first aspect of the present invention is an image forming apparatus including:

a job input unit to input a job;
a job storage to store the job input by the job input unit;
a link setting unit to link a new job input from the job input unit and the stored job stored in the job storage, or to link each independent job stored in the job storage;
a storage section to store link information indicating the link of jobs set by the link setting unit;
a control section to execute predetermined processes based on the link information stored in the storage section; and
a print section to print the job.

Preferably, the storage section stores link information indicating that a plurality of jobs are linked to one job.

Preferably, the control section executes printing the linked jobs at one time with the print section.

Preferably, the image forming apparatus further includes:
an operation section; and
a display section, wherein
the control section displays a list of jobs stored in the job storage on the display section, and
when one job is selected from the list with the operation section, the control section displays jobs linked to the selected job so that the jobs are distinguishable from other jobs on the display section.

Preferably, the control section displays a printing status of the jobs linked to the selected job on the display section.

Preferably, the control section displays a list of jobs stored in the job storage on the display section; and prints the jobs linked to the selected job with the print section at one time in accordance with an operation of the operation section.

Preferably, the control section displays an instruction to print jobs linked to a new job or the stored job on the display section when the new job or the stored job is printed.

Preferably, the image forming apparatus further includes a setting unit to set an independent printing condition for each linked job.

Preferably, the image forming apparatus further includes a coupling section to couple a printing condition of one of the linked job with a printing condition of the other linked job.

Preferably, the control section performs warning when an instruction to delete any one of job stored in the job storage and linked to the other job is input with the operation section.

Preferably, the image forming apparatus configures a first system and a second system, and the link setting unit links a job printable in the first system and a job printable in the second system.

Preferably, the control section displays an instruction to print jobs linked to a job printed in the first system and printable in the second system on the display section when the first system is changed to the second system.

Preferably, the first system uses a fixing unit for envelopes and the second system uses a fixing unit for sheets other than envelopes.

Preferably, the image forming apparatus further includes a coupling section to adjust copies of a content job printing documents inserted in envelopes to copies of an envelope job printing the envelopes.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is an example of a copy setting screen;

FIG. 6 is an example of a temporary-stored job list screen;

FIG. 10 is an example of an inquiry screen inquiring whether a link of a content job with an envelope job is set;

FIG. 13A is an example of a temporary-stored job list screen displayed at step S21 of FIG. 12A;

DETAILED DESCRIPTION OF THE INVENTION

A scheme and a behavior of an image forming apparatus are illustrated below with drawings. In this embodiment, a color image forming apparatus 1 is described as an example. However, the invention is not limited to this. For example, a monochrome image forming apparatus can attain the object of the invention.

(Scheme of an Image Forming Apparatus 1)

Scheme of the image forming apparatus 1 is illustrated below.

Figure 1:
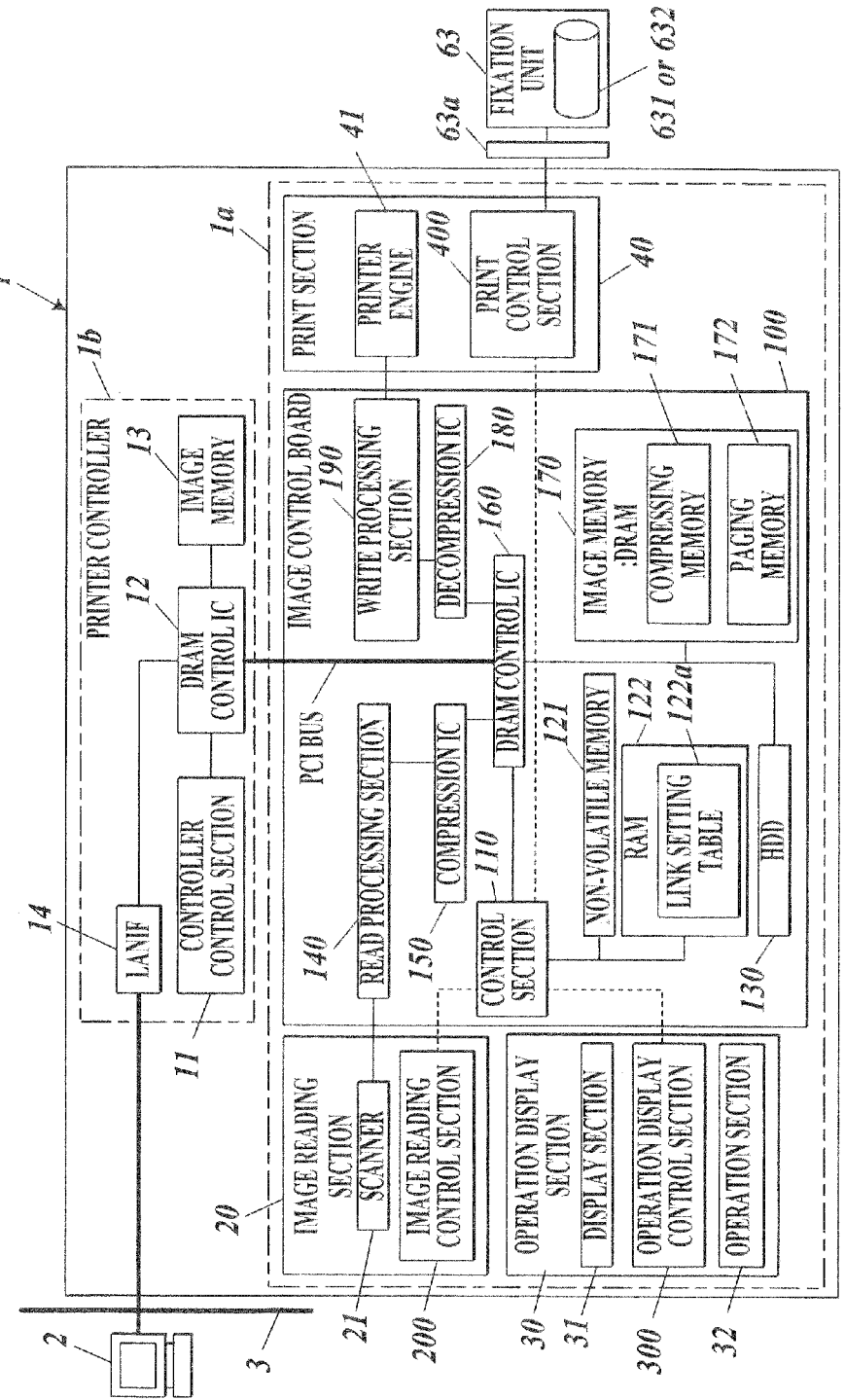
FIG. 1 is a block diagram of an image forming apparatus.

FIG. 1 is a block diagram of the image forming apparatus 1. As illustrated in FIG. 1, the image forming apparatus 1 includes a main body 1a and a printer controller 1b. The image forming apparatus 1 interconnects to an external device 2 on a network 3 via LANIF (Local Area Network InterFace) 14 of the printer controller 1b for transmitting and receiving information each other.

The main body 1a includes an image reading section 20, an operation display section 30, a print section 40, and an image control board 100.

The image reading section 20 includes a scanner 21, an image reading control section 200, and so forth. The scanner 21 includes an ADF (Auto Document Feeder), an image sensor, and so forth. The image reading control section 200 controls the scanner 21 based on a command from the control section 110 to read images as an analog signal, and outputs the analog signal to a read processing section 140. Here, "images" includes not only image data such as graphics or photos, but also text data such as characters or symbols.

The operation display section 30 includes a display section 31, an operation section 32, and an operation display control section 300.

The operation display control section 300 displays various screens, for inputting print settings of jobs, various results of processings, or the like, on the display section 31, based on a display signal input from the control section 110. The display section 31 is, for example, composed of a LCD (Liquid Crystal Display). The operation display control section 300 outputs an operation signal input from the operation section 32 to the control section 110. The operation section 32 includes various switches, keys such as a numerical keypad or operation keys, or a touchscreen.

The print section 40 includes a print control section 400 and a printer engine 41. The print section 40 performs electrographic printing based on image data input to the print section 40.

The print control section 400 receives a control signal from the control section 110 and controls processings of each part of the printer engine 41.

Figure 2:
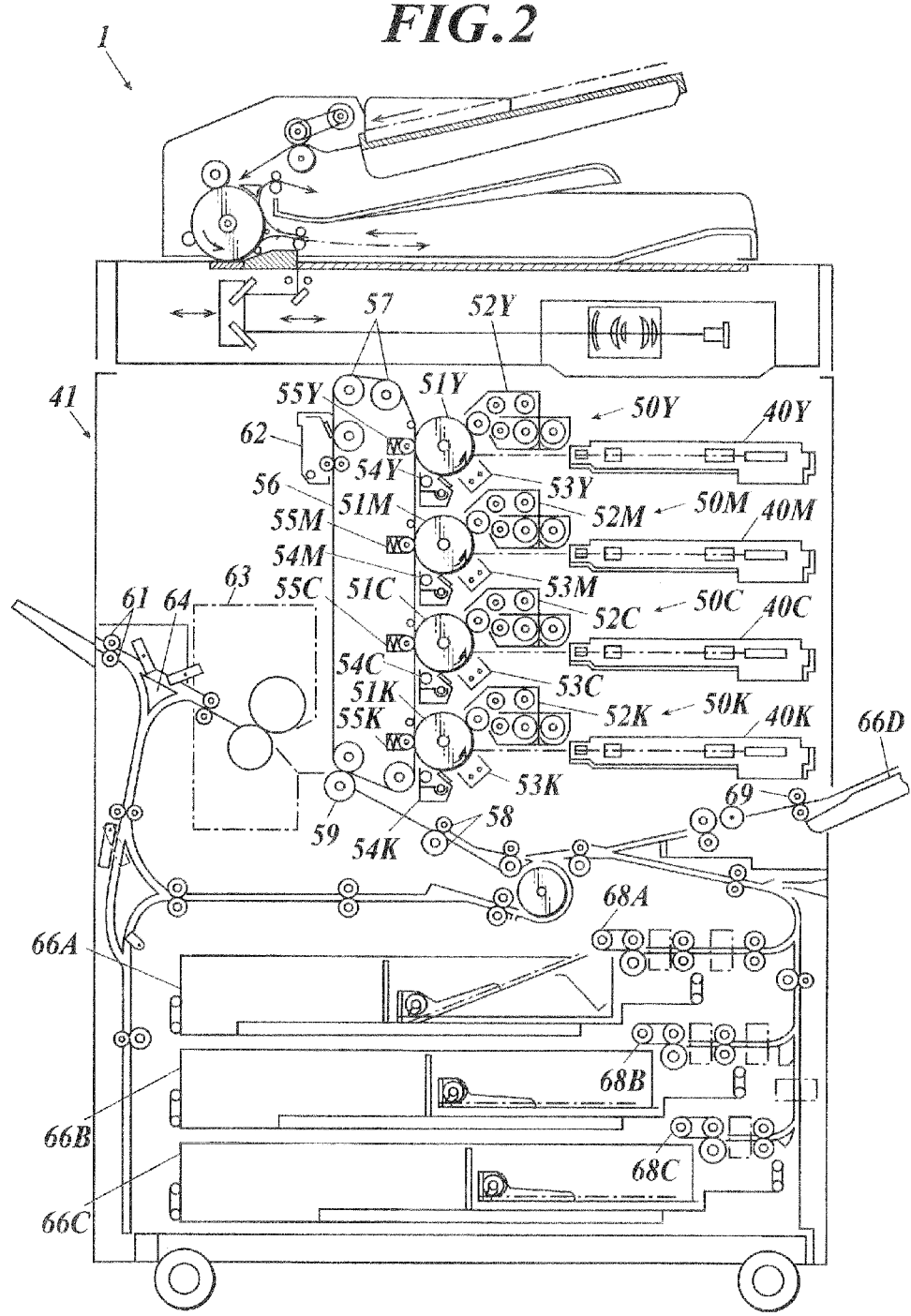
FIG. 2 is an illustration of a print section.

FIG. 2 illustrates a main section of the printer engine 41. As illustrated in FIG. 2, the printer engine 41 includes optical units 40Y, 40M, 40C, 40K, image forming unit 50Y, 50M, 50C, 50K, an intermediate transfer belt 56, a resistration roller 58, a secondary transferring roller 59, a fixing unit 63, and a paper ejection roller 61.

Each optical unit 40Y, 40M, 40C, and 40K outputs laser beams onto each photosensitive drum 51Y, 51M, 51C, 51K and forms latent images on a photosensitive drum, based on image data input from a write processing section 190.

Each image forming unit 50Y, 50M, 50C, and 50K forms toner images of each color, Y, M, C, and K.

The toner images formed by image forming units 50Y, 50M, 50C, and 50K are primarily transferred on the intermediate transfer belt 56 (primary transfer).

The resistration roller 58 conveys a sheet to the secondary transferring roller 59 in synchronism with toner images formed on the intermediate transfer belt 56.

The secondary transferring roller 59 moves the toner image formed on the intermediate transfer belt 56 to the sheet.

The fixing unit 63 fixes the toner image on the sheet.

The paper ejection roller 61 ejects the sheet.

Each note Y, M, C, K of each part means yellow, magenta, cyan, and black.

The image forming unit 50Y includes a photosensitive drum 51Y, a developing device 52Y, a charging device 53Y, a cleaner 54Y, and a primary transferring roller 55Y. Each image forming unit 50M, 50C, 50K is similar to the image forming unit 50Y.

Next, a behavior of the printer engine 41 is illustrated below. First, in the image forming unit 50, the photosensitive drum 51Y rotates and the charging device 53Y charges the surface of the photosensitive drum 51Y. Then the optical unit 40Y exposes the charged surface to a laser beam and thereby a latent image of Y data is formed. The latent image is developed by the developing device 52Y and thereby a yellow toner image is formed. The toner image is transferred primarily onto the intermediate transfer belt 56 pressed by the primary transferring roller 55Y. The toner image becomes a yellow image corresponding to the image data output on the sheet. The toner which does not used for the primary transfer is removed by the cleaner 54Y.

In image forming units 50M, 50C, 50K, a magenta toner image, a cyan toner image, a black toner image are formed in the same way.

Rotations of rollers 57, primary transferring rollers 55Y, 55M, 55C, 55K, secondary transferring roller 59 rotates the intermediate transfer belt 56 and transfer YMCK toner images in sequence onto the intermediate transfer belt 56 so that the YMCK toner images overlap each other. Any one of rollers 68A-68C, 69 rotates and feeds a sheet from any one of feeding trays 66A-66D. The resistration roller 58 rotates and feeds the sheet to the secondary transferring roller 59.

When the sheet passes through the part where the secondary transferring roller 59 presses the intermediate transfer belt 56, YMCK toner images on the intermediate transfer belt 56 are transferred secondarily on the sheet. The sheet on which YMCK toner images are transferred passes through the fixing unit 63. Pressurized and heated by the fixing unit 63, YMCK toner images are fixed on the sheet and thereby a color toner image is formed on the sheet. The sheet on which the image is formed is ejected by the paper ejection roller 61.

After forming the image on the sheet, the belt cleaner 62 removes a residual toner on the intermediate transfer belt 56. A positive or negative current flows from a power source (not shown) to the secondary transferring roller 59, with switching the current polarity alternately and thereby the residual toner on the secondary transferring roller 59 is transferred again onto the intermediate transfer belt 56. Thus, the secondary transferring roller 59 is cleaned.

Here, the fixing unit 63 is detachable from the image forming apparatus 1. There are two kinds of fixing units 63. One is a first fixing unit 631 and the other is a second fixing unit 632. One of them is attached as the fixing unit 63 to the image forming apparatus 1. The first fixing unit 631 is a fixing unit (general fixing unit) used for printing of sheets other than envelopes. The second fixing unit 632 is a fixing unit (envelope fixing unit) for printing of envelopes only. The second fixing unit 632 is specialized for printing envelopes. For example, the second fixing unit 632 has a thinner fixing roller so that the envelopes do not wrinkle easily. When the second fixing unit 632 is used for fixing of sheets other than envelopes, the sheets will damage and the cost will increase. Thus, the second fixing unit 632 is used for fixing of envelopes only, and the first fixing unit 631 is used for fixing of sheets other than envelopes.

Hereinafter a system of the image forming apparatus 1 attaching the first fixing unit 631 is called a "first system", and a system of the image forming apparatus 1 attaching the second fixing unit 632 is called a "second system".

A region of the image forming apparatus 1 where the fixing unit 63 is attached has a port 63a as a unit identifying section which identifies the kind of the attached fixing unit 63. For example, when the first fixing unit 631 is attached to the image forming apparatus 1, the port 63a outputs a HIGH signal as a fixing unit identifying signal to the print control section 400. When the second fixing unit 632 is attached to the image forming apparatus 1, the port 63a outputs a LOW signal as a fixing unit identifying signal to the print control section 400. The print control section 400 identifies the kind of system of the image forming apparatus 1 based on the fixing unit identifying signal.

In addition, a post-processing apparatus (not shown) which performs a post-processing on parts of sheets, such as sorting, stapling, binding, and case working, may be connected to the image forming apparatus 1.

The image control board 100 includes a control section 110, a non-volatile memory 121, a RAM (Random Access Memory) 122, a HDD 130, the read processing section 140, a compression IC 150, a DRAM (Dynamic Random Access Memory) control IC 160, an image memory 170, a decompression IC 180, a write processing section 190, and so forth.

The control section 110 is composed of a CPU (Central Processing Unit) and so forth. The control section 110 reads a specified program out of system programs and application programs stored in the non-volatile memory 121; expands the read program in the RAM 122; execute various processings in cooperation with the expanded program; and control each unit of the image forming apparatus 1 integrally.

For example, the control section 110 executes, as described below, registering a new job, operating stored jobs, printing, replacing of fixing units. That is, the control section 110 functions as a job input unit, a link setting unit, a control section, and a setting unit.

The non-volatile memory 121 stores system programs and application programs which the control section 110 can execute.

The RAM 122 is used for a working storage area in which various programs executed by the control section 110 and various data regarding the programs are temporarily stored.

For example, the RAM 122 stores a link table 122a as described below, and a feeding tray setting information. The feeding tray setting information is a information regarding a kind of paper inserted in each feeding tray. The kind of paper includes the size of the sheet.

The RAM 122 has a reservation job region and a temporary-stored job region. The reservation job region stores a registered reservation job. The temporary-stored job region stores a job which is directed to be stored temporarily or a job on which a link is set. The job is composed of image data and a setting information for printing of the image data. Hereinafter, when the print section 40 "prints based on a job", it is called "run a job", or, "print a job". The RAM 122 functions as a job storage or a memory.

The HDD (Hard Disk Drive) 130 stores and reads out the job, on the basis of the control of the control section 110.

The read processing section 140 performs various processings to an analog image signal input from the image reading section 20, such as an analog processing; an analog to digital conversion; and a shading, and thereby generates a digital image data. The generated image data is output to the compression IC 150.

The compression IC 150 compresses the input image data and outputs the compressed data to the DRAM control IC 160.

DRAM control IC 160 controls the compression IC 150 compressing the image data; controls the decompression IC 180 decompressing the compressed image data; and controls the image memory 170 inputting/outputting the image data, under the control of the control section 110.

For example, when an instruction for storing the image signal read by the image reading section 20 is input from the control section 110 to the DRAM control IC 160, the DRAM control IC 160 forces the compression IC 150 to compress the image data input to the read processing section 140; and stores the compressed image data in a compressing memory 171 of the image memory 170. When an instruction for printing the compressed image data stored in the compressing memory 171 is input from the control section 110 to the DRAM control IC 160, the DRAM control IC 160 reads the compressed image data from the compressing memory 171; forces the decompression IC 180 to decompress the compressed image data; and stores the decompressed image data in a paging memory 172. When the instruction for printing of the image data stored in the paging memory 172 is finished, the DRAM control IC 160 reads the image data from the paging memory 172 and outputs to the write processing section 190.

The image memory 170 includes the compressing memory 171 and the paging memory 172, consisting of DRAM (Dynamic RAM). The compressing memory 171 is a memory for storing a compressed image data. The paging memory 172 is a memory for storing a image data for printing temporarily.

The decompression IC 180 decompresses the compressed image data and outputs the decompressed digital image data to the write processing section 190.

The write processing section 190 outputs the decompressed digital image data to the printer engine 4.

Each section of the printer controller 1b is described below. The printer controller 1b controls a data input from the external device 2 connected to the network 3 to the image forming apparatus when the image forming apparatus 1 is used as a network printer.

The printer controller 1b consists of a controller control section 11, a DRAM control IC 12, an image memory 13, and a LANIF (Local Area Network InterFace) 14.

The controller control section 11 controls each section of the printer controller 1b integrally; analyzes and rastarizes a data language of printing data input from the external device 2 via LANIF 14; generates an image data and a job data indicating a condition for forming the image data; and outputs the image data and the job data to the main body 1a.

The DRAM control IC 12 controls storing a data received via LANIF 14 to the image memory 13 and reading the data from the image memory 13. The DRAM control IC 12 is connected to the DRAM control IC 160 of the image control board 100 via PCI (Peripheral Components Interconnect bus). The DRAM control IC 12 reads the image data for printing and the job data generated based on the image data from the image memory 13 and outputs the image data and the job data to the RAM control IC 160, under the control of the controller control section 11.

The image memory 13 consisting of DRAM stores an input data temporarily.

The LANIF 14 is a communication interface such as NIC (Network Interface Card) or a modem for connecting to the network 3 such as LAN. The LANIF 14 receives a data from the external device 2. The received data is output to the DRAM control IC 12.

(Behavior of the Image Forming Apparatus 1)

Behavior of the image forming apparatus 1 of the present embodiment is described below.

The image forming apparatus 1 of the present embodiment can set a link between a newly input job and the other job temporary-stored in the temporary-stored job region of the RAM 122 when registering a new job as described below. Moreover, the image forming apparatus 1 can set a link between the temporary-stored jobs when operating the stored jobs.

[Registering a New Job]

Figure 3:
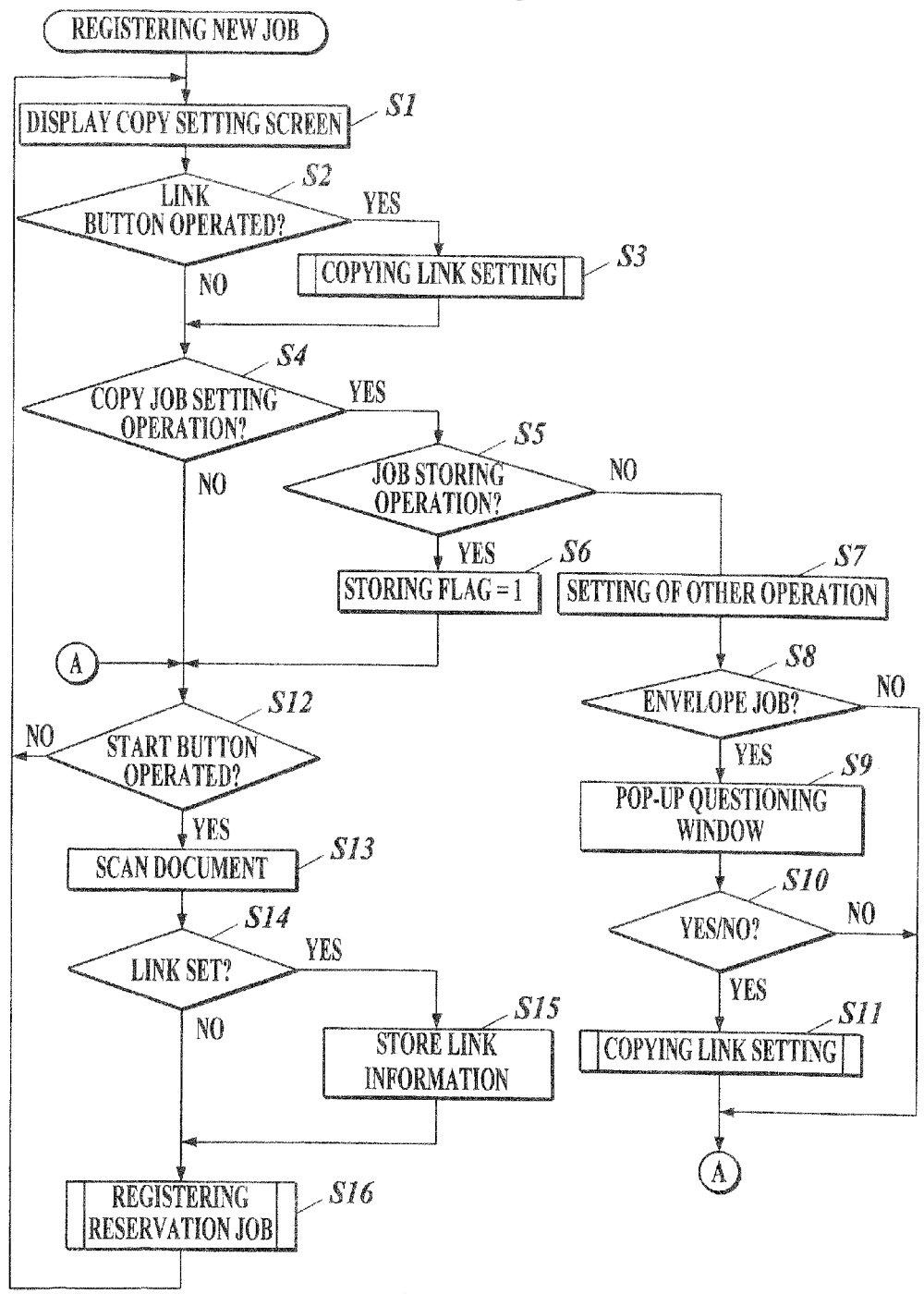
FIG. 3 is a flowchart illustrating a registering of a new job executed by the control section of FIG. 1.

FIG. 3 illustrates a flowchart of registering a new job. The registering is performed by the image forming apparatus 1. The registering of a new job is executed by the control section 110 in cooperation with a program stored in the non-volatile memory 121 in accordance with an operation of the operation section 32 in a copy mode.

First, a copy setting screen 311 is displayed on the display section 31 (step S1).

FIG. 4 shows an example of the copy setting screen 311. The copy setting screen 311 is a screen for setting a printing condition for a newly input job. As shown in FIG. 4, the copy setting screen 311 has operation buttons for setting a printing condition of a job, such as "Document Setting", "Quality", "Zoom", "Simplex/Duplex", "Finishing", "Color", and "Paper". Moreover, the copy setting screen 311 has a "Link" button 311a, "Temporary-store" key 311b, or the like. The "Link" button 311a is a button for setting a link between a newly input job and the other job. "Setting a link" means linking each jobs whereas the each job is independent. The "Temporary-store" key 311b is a button for instructing to store the newly input job temporarily.

Next, the control section 110 judges whether the "Link" button 311a on the copy setting screen 311 is operated with the operation section 32 (step S2). When the control section 110 judges that the "Link" button 311a is not operated (step S2; NO), the processing moves to step S4. When the control section 110 judges that the "Link" button 311a is operated (step S2; YES), a copying link setting is executed (step S3).

Figure 5:
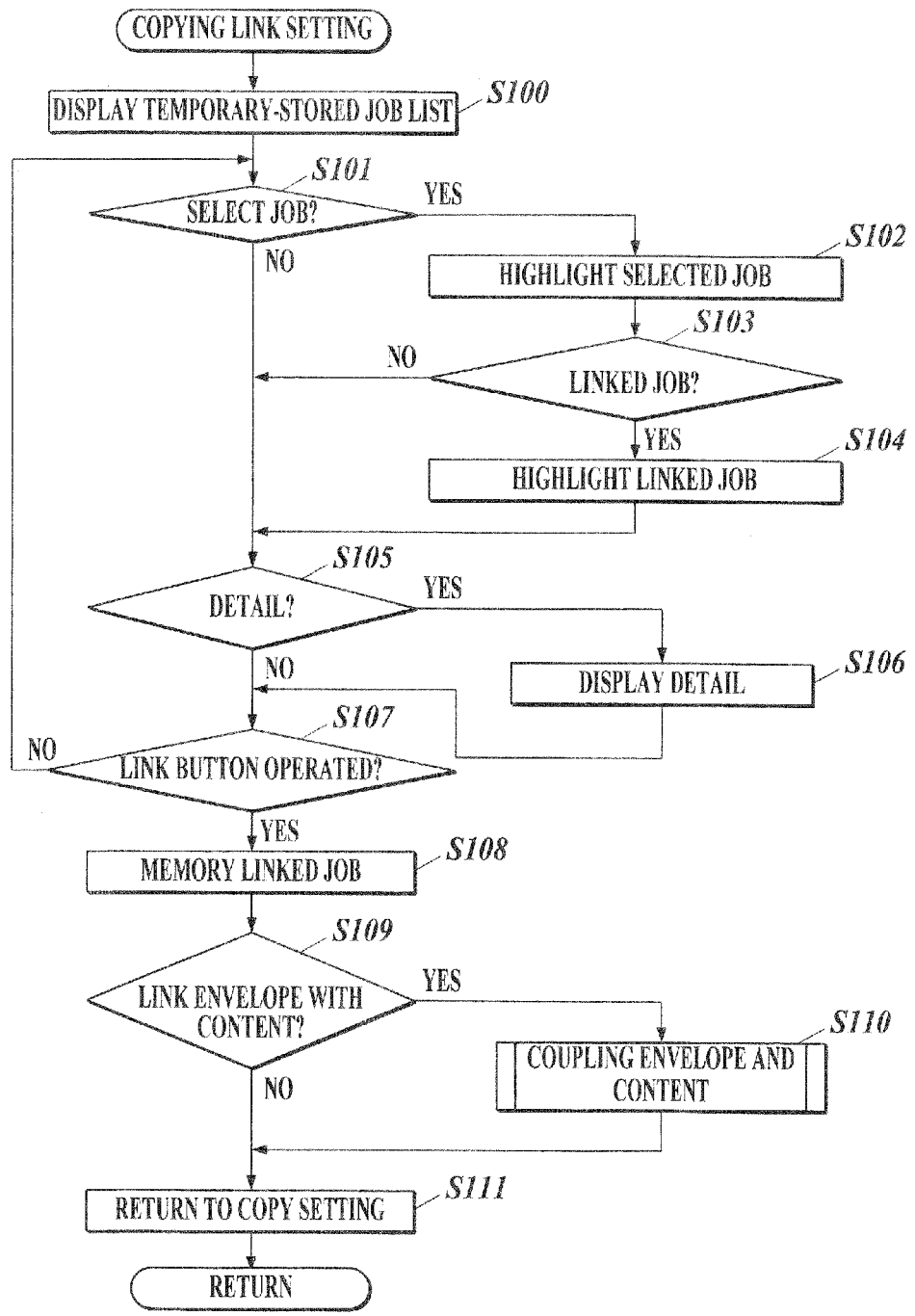
FIG. 5 is a flowchart illustrating a copying link setting executed by the control section.

FIG. 5 shows an example of a flowchart of the copying link setting executed in step S3 of FIG. 3. The copying link setting is executed by the control section 110 in cooperation with a program stored in the non-volatile memory 121.

First, the temporary-stored job list screen 312 is displayed on the display section 31 (step S100).

Figure 6:
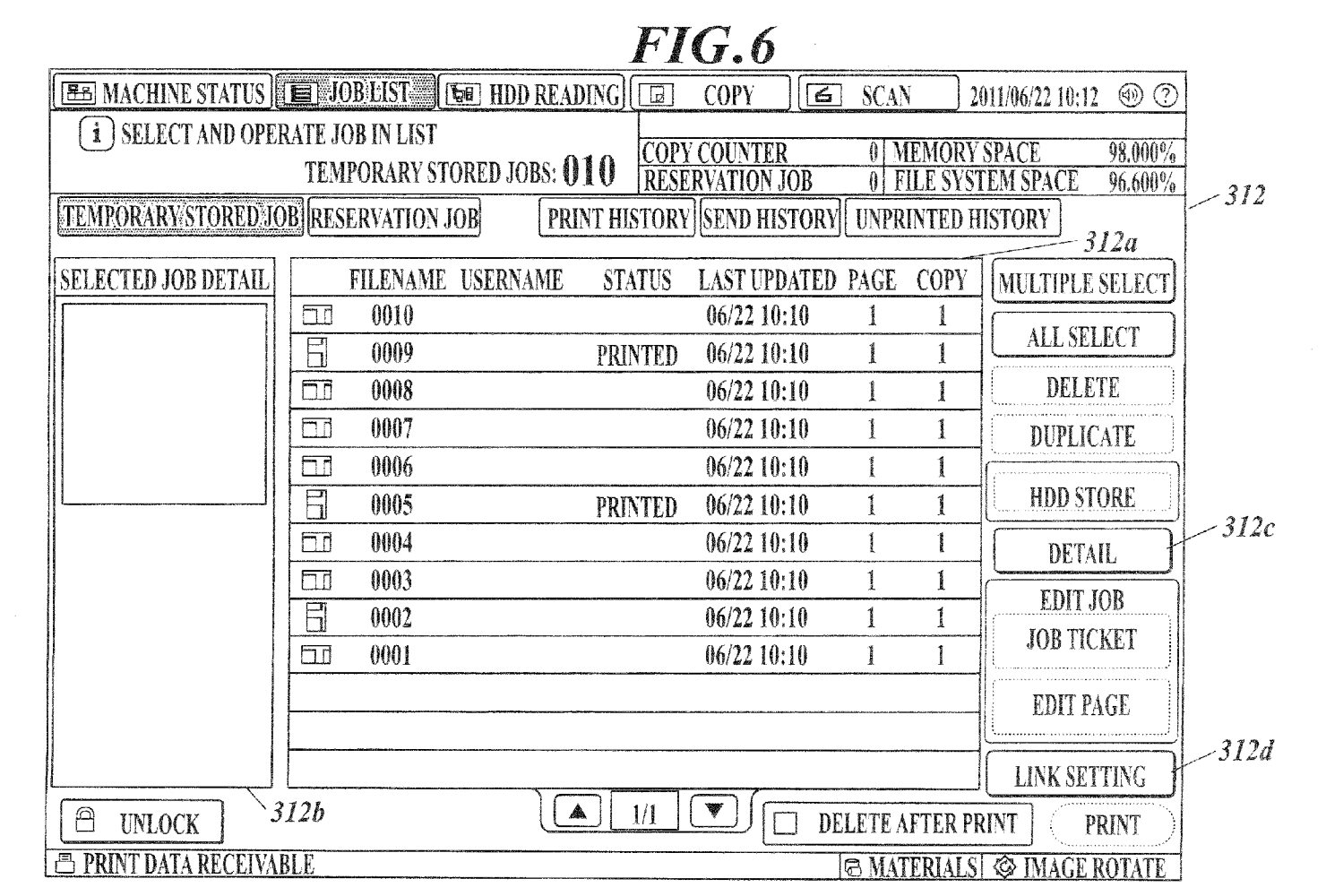

FIG. 6 shows an example of the temporary-stored job list screen 312. As shown in FIG. 6, the temporary-stored job list screen 312 has a job list column 312a, a selected job detail column 312b, a detail displaying button 312c, a link setting key 312d, and the like.

The job list column 312a displays a job list of jobs stored in the temporary-stored job region of the RAM 122 temporarily. The selected job detail column 312b displays a job detail of the job selected from the job list of the job list column 312a. The detail displaying button 312c is used for instructing the displaying of the detail of the selected job. The link setting key 312d is used for instructing to fix a link setting.

Next, the control section 110 judges whether a job is selected in the job list column 312a of the temporary-stored job list screen 312 (step S101 in FIG. 5). When the control section 110 judges that a job is not selected (step S101; NO), the processing moves to step S105.

Figure 7:
FIG. 7 is an example of a link table.

On the other hand, when the control section 110 judges that a job is selected (step S101; YES), the selected job is displayed in a selected state (highlighted) (step S102), the control section 110 judges whether a link is set on the selected job (step S103). Here, RAM 122 stores a link table 122a shown in FIG. 7. As shown in FIG. 7, the link table 122a is a table for storing a JOB ID for identifying a job; a job status (whether the job is printed) of the job identified by the JOB ID; and linked jobs which are linked to the job identified by the JOB ID. The control section 110 judges whether the selected job has a linked job by referring to the link table 122a in step S103 of FIG. 5.

When the control section 110 judges that the selected job is not linked to another job (step S103; NO), the processing moves to S105. When the control section 110 judges that the selected job has a linked job (step S103; YES), the linked jobs are also displayed in the selected state (highlighted) in the job list column 312a (step S104), and the processing moves to S105. In step S104, the user can easily identify the jobs linked to the selected job.

The control section 110 judges whether the detail displaying button 312c is operated (step S105). When the control section 110 judges that the detail displaying button 312c is not operated (step S105; NO) the processing moves to S107. When the control section 110 judges that the detail displaying button 312c is operated (step S105; YES), detail of the selected job such as setting, page layout, printing status or the like is displayed on the selected job detail column 312b (step S106), and the processing moves to S107. When several jobs are selected, a pop-up window (see FIG. 13B) displaying JOB IDs of the selected jobs is displayed on the temporary-stored job list screen 312. When one of the JOB IDs is selected, a job detail of the selected JOB ID is displayed on the selected job detail column 312b.

The control section 110 judges whether the link setting key 312d is operated (step S107). When the control section 110 judges that the link setting key 312d is not operated (step S107; NO), the processing returns to S101. When the control section 110 judges that the link setting key 312d is operated (step S107; YES), the selected job is stored temporarily in the RAM 122 as a job linked to a newly input job (step S108). The selected job is not registered in the link table 122a in step S108.

Next, the control section 110 judges whether an envelope job is linked to a content job (step S109). For example, when the sheet setting of one of a newly input job and a linked job is set as "envelope" (a tray loaded with envelopes is selected as a feeding tray), and the sheet setting of the other is set as a kind of paper other than "envelope" (a tray loaded with sheets other than envelopes is selected as a feeding tray), the control section 110 judges that an envelope job is linked to a content job.

When the control section 110 judges that an envelope job is not linked to a content job (step S109; NO), the display of the display section 31 returns to the copy setting screen 311 (step S111), and the processing moves to step S4 of FIG. 3.

When the control section 110 judges that an envelope job is linked to a content job (step S109; YES), the operation section 32 executes a coupling of copies of the envelope job and copies of the content job (step S110).

Figure 8:
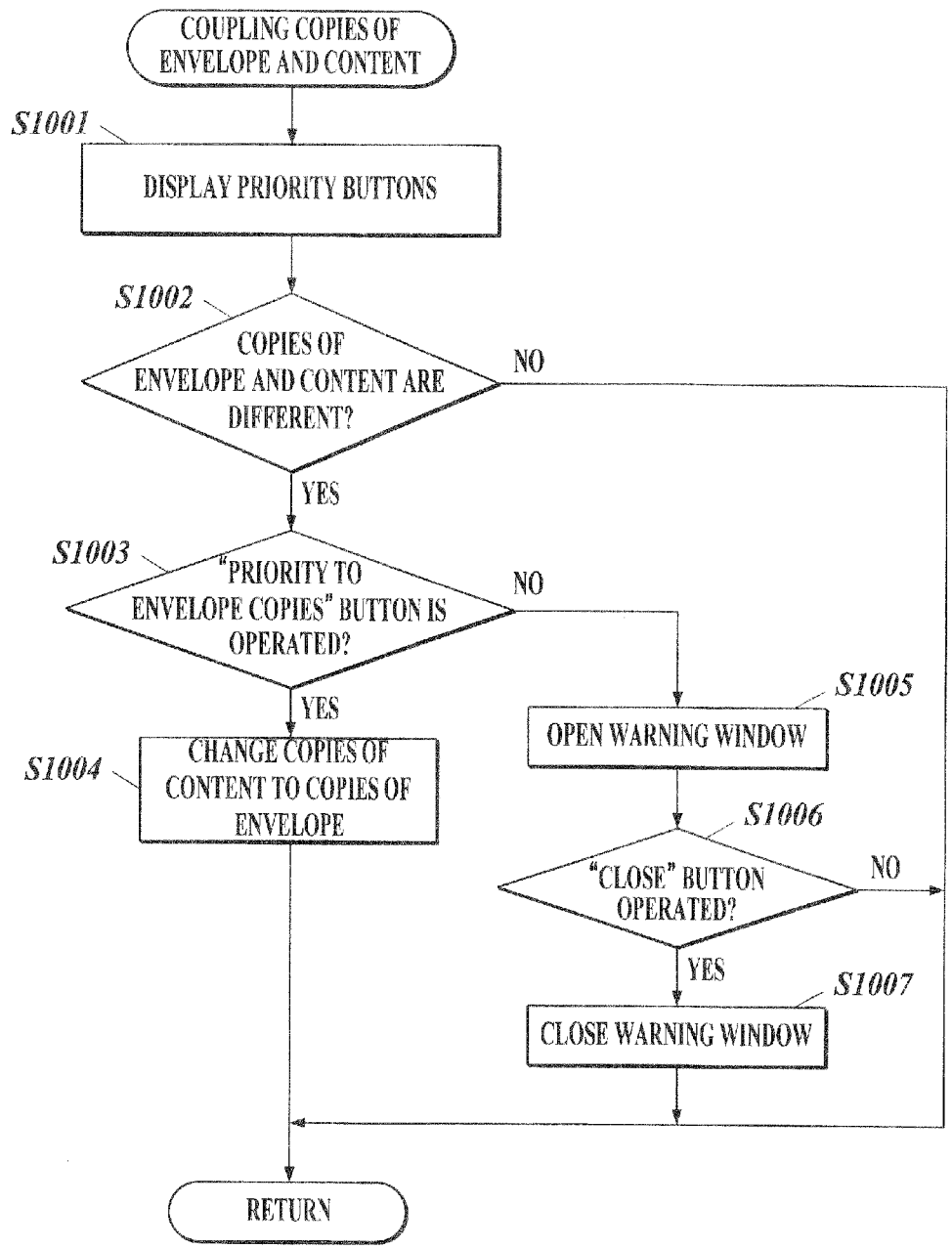
FIG. 8 is a flowchart illustrating a coupling of copies of an envelope job and copies of a content job, the coupling executed by the control section of FIG. 1.

FIG. 8 shows a flowchart of coupling of copies of the envelope job and copies of the content job. The coupling is executed by the control section 110 in cooperation with a program stored in the non-volatile memory 121.

Figure 9A:
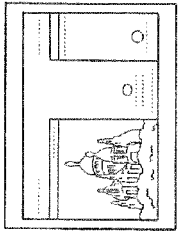
FIG. 9A is an example of a temporary-stored job list screen displayed at the step S1001 of FIG. 8.

First, the temporary-stored job list screen 312 displays a button 312e giving priority to copies of the envelope job and a button 312f giving priority to copies of the content job (step S1001). FIG. 9A shows an example of the temporary-stored job list screen 312 displayed in step S1001. As shown in FIG. 9A, the buttons 312e and 312f are displayed in the temporary-stored job list screen 312. The button 312e is used for instructing to adjust copies of the content job to copies of the envelope job. The button 312f is used for instructing to adjust copies of the envelope job to copies of the content job.

Next, the control section 110 judges whether copies of the linked envelope job is different from copies of the content job (step S1002). When the control section 110 judges that copies of the linked envelope job is the same as copies of the content job (step S1002; NO), the processing moves to step S111 of FIG. 5.

When the control section 110 judges that copies of the linked envelope job is different from copies of the content job (step S1002; YES), the control section 110 judges whether the button 312e is selected with the operation section 32 (step S1003). When the control section 110 judges that the button 312e is selected with the operation section 32 (step S1003; YES), copies of the content job is adjusted to copies of the envelope job (step S1004), the processing moves to step S111 of FIG. 5.

Figure 9B:
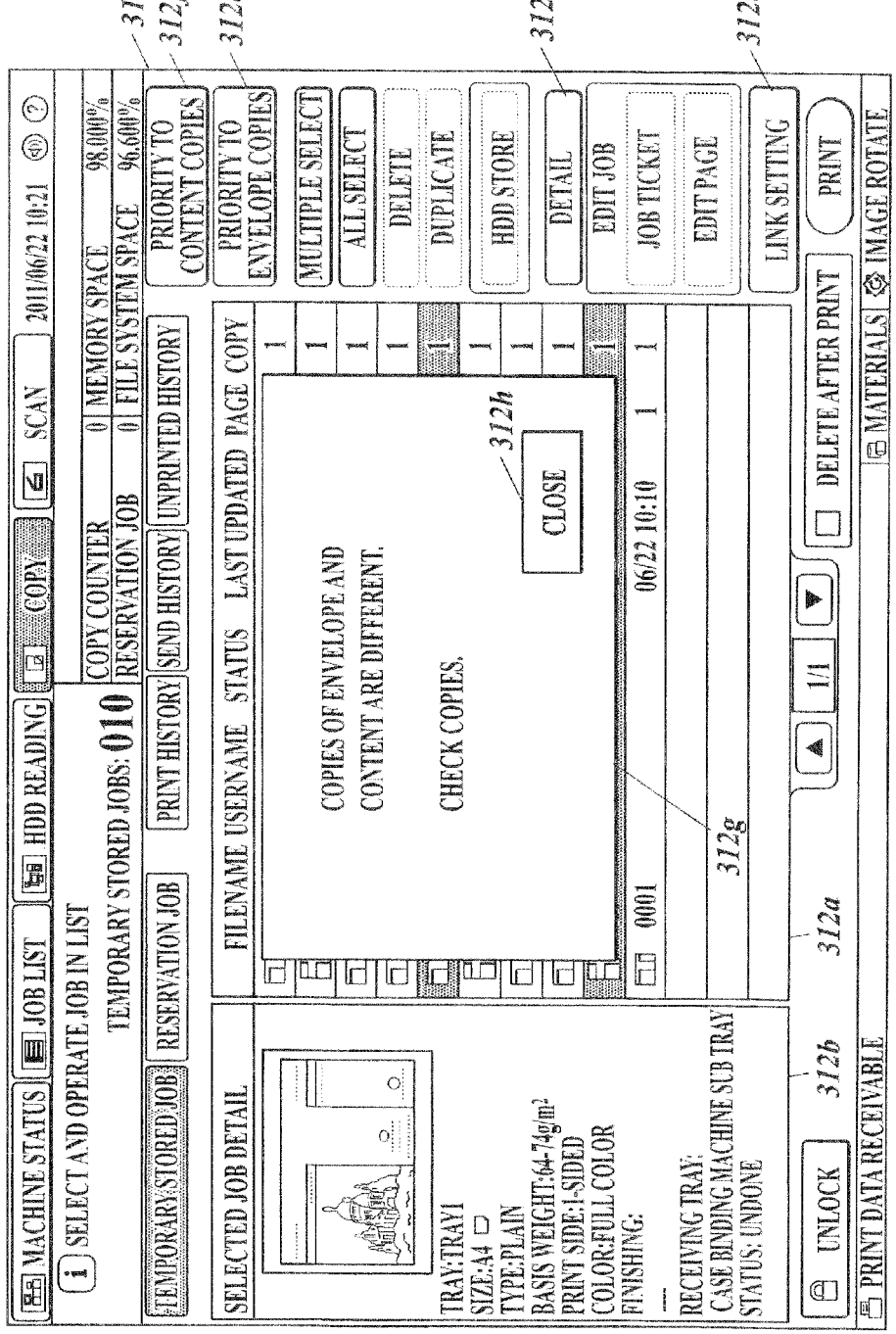
FIG. 9B is an example of a warning screen displayed at the step S1005 of FIG. 8.

On the other hand, when the control section 110 judges that, not the button 312e but the button 312f is selected with the operation section 32 (step S1003; NO), the display section 31 displays a pop-up window 312g warning that copies of the envelope job is different from copies of the content job (step S1005). FIG. 9B shows an example of the pop-up window 312g displayed by display section 31 in step S1005. The envelope job includes addresses printed on envelopes and thereby copies of the envelope job can not be adjusted to copies of the content job automatically. Thus, when the button 312f is selected, the user is warned by the pop-up window 312g to confirm the setting.

When a "close" button 312h of the pop-up window 312g is operated with the operation section 32 (step S1006; YES), a signal to close the warning screen 312g is input to the control section 110. The control section 110 closes the warning screen 312g (step S1007) and the processing moves to step S111 of FIG. 5.

The link setting of the envelope job to the content job can couple copies of the envelope job with copies of the content job.

The screen of the display section 31 returns to the copy setting screen 311 in step S111 of FIG. 5 and the processing moves to step S4 of FIG. 3.

The control section 110 judges whether an operation regarding a copy job setting is performed on the copy setting screen 311 with the operation section 32 in step S4 of FIG. 3. When the control section 110 judges that the operation regarding a copy job is not performed on the copy setting screen 311 with the operation section 32 (step S4; NO), the processing moves to S12.

When the control section 110 judges that the operation regarding a copy job is performed on the copy setting screen 311 with the operation section 32 (step S4; YES), the control section 110 judges whether the operation is a setting of a job storing (step S5). When the control section 110 judges that the operation is the setting of a job storing (a "Temporary-store" key 311b is operated with the operation section 32) (step S5; YES), a storing flag of a newly input job is set to 1 (recorded in the RAM 122) (step S6), and the processing moves to S12.

Figure 10:
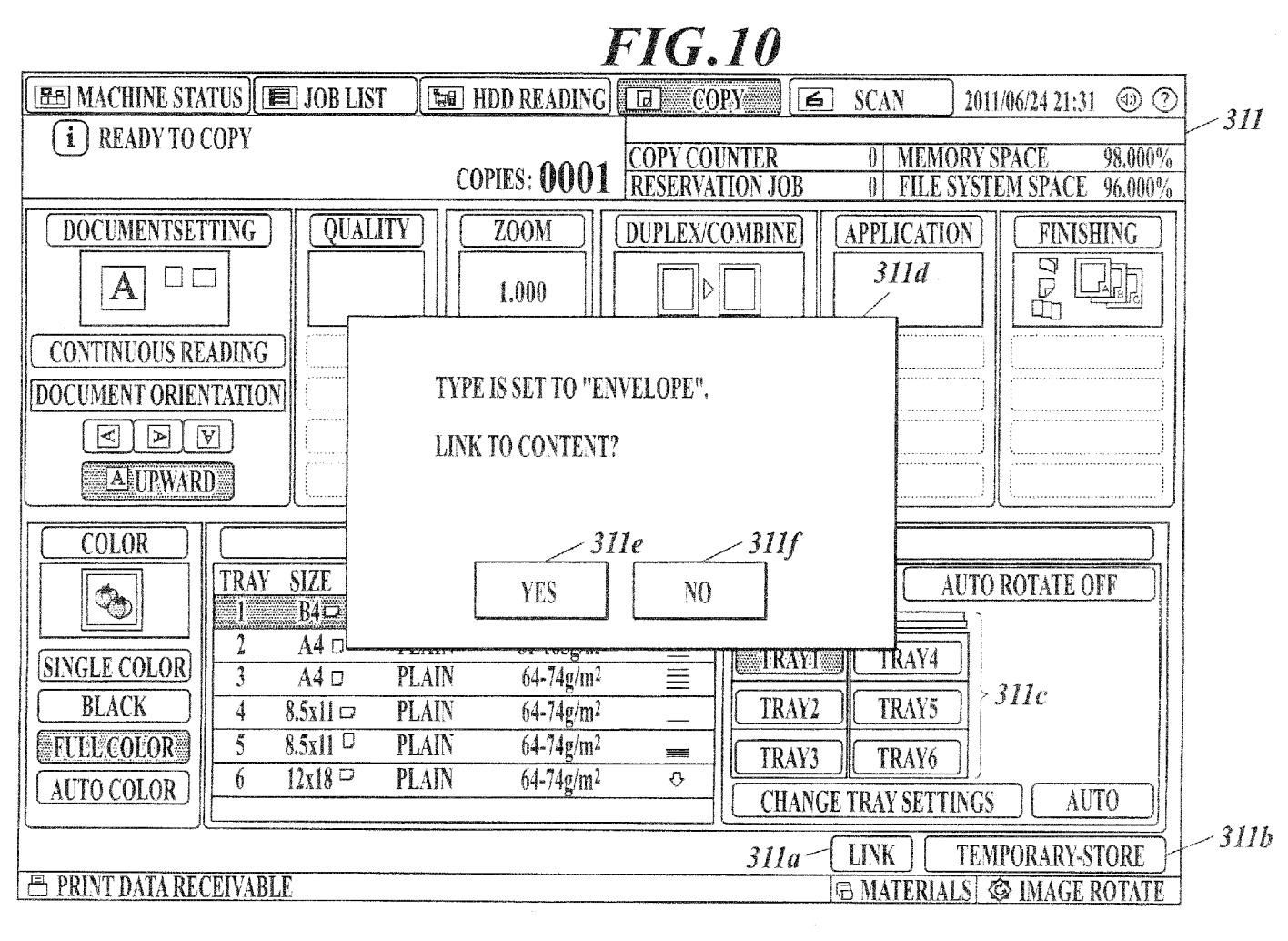

On the other hand, when the control section 110 judges that the operation is not the setting of a job storing (step S5; NO), the setting according to the operation is temporarily stored in the RAM 122 as a setting information of the newly input job (step S7). Next, the control section 110 judges whether a new envelope job is set (step S8). Specifically, when a feeding tray loaded with envelopes is selected as a feeding tray is selected with feeding tray selecting buttons 311c, the control section 110 judges that an envelope job is set. When the control section 110 judges that a new envelope job is not set (step S8; NO), the processing moves to S12. When the control section 110 judges that a new envelope job is set (step S8; YES), a questioning window 311d pops up on the display section 31. The screen 311d questions whether the envelope job links to a content job. FIG. 10 illustrates an example of the questioning window 311d. As shown in FIG. 10, the questioning window 311d displays: a message "the kind of paper is set to envelopes. Link to content job?"; "YES" button 311e; and "NO" button 311f.

When the "YES" button 311e is operated with the operation section 32 (step S10; YES), the copying link setting illustrated in FIG. 5 is executed; the envelope job is linked with a content job according to the operation of the operation section 32 (step S11); and the processing moves to S12. When the "No" button 311f is operated with the operation section 32 (step S10; NO), the processing moves to S12.

The control section 110 judges whether a start button of the operation section 32 is operated in step S12. When the control section 110 judges that the start button of the operation section 32 is not operated (step S12; NO), the processing moves to S1. When the control section 110 judges that the start button of the operation section 32 is operated (step S12; YES), an original document placed on a document tray of the image reading section 20 is read and an image data is obtained (step S13). The image data is an image data of a newly input job. Then a JOB ID is generated for the newly input job, associated with the obtained image data, and stored in the RAM 122 temporarily. Then, inputting of the new job is finished.

Next, the control section 110 judges whether a link is set on the newly input job (step S14). When the control section 110 judges that a link is not set on the newly input job (step S14; NO), the processing moves to S16.

When the control section 110 judges that a link is set on the newly input job (step S14; YES), the JOB ID of the newly input job is linked to the JOB ID of the linked job and registered in the link table 122a of the RAM 122 (step S15), and the processing moves to S16.

The control section 110 executes registering of a reservation job in step S16.

Figure 11:
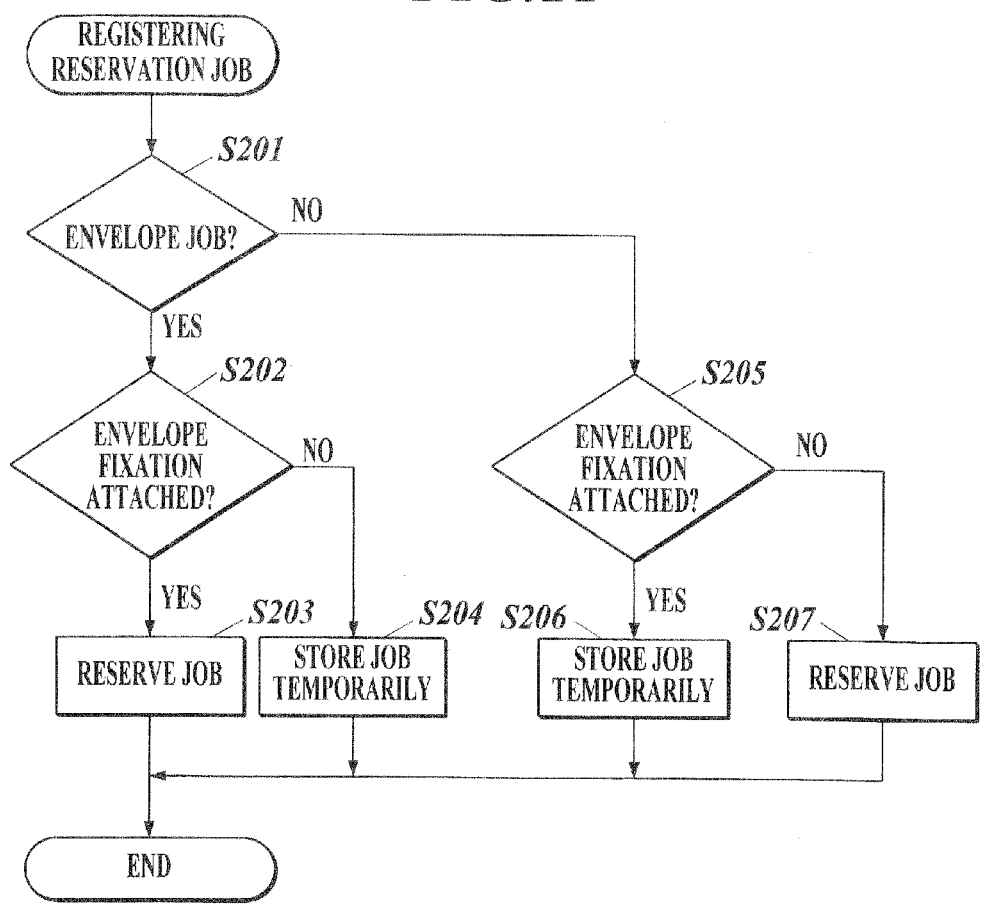
FIG. 11 is a flowchart illustrating a registrating of a reservation job, the registrating executed by the control section of FIG. 1.

FIG. 11 shows a flowchart of the registering of the reservation job. The registering is executed by the control section 110 in cooperation with a program stored in the non-volatile memory 121.

First, the control section 110 refers to a setting information of a job stored in the RAM 122 and judges whether the job registering as the reservation job is an envelope job (step S201).

When the control section 110 judges that the job registering as the reservation job is an envelope job (step S201; YES), the control section 110 judges whether the second fixing unit 632 which is an envelope fixing unit is attached to the image forming apparatus 1 (step S202). When the control section 110 judges that the second fixing unit 632 is attached to the image forming apparatus 1 (step S202; YES), the setting information temporarily stored in the RAM 122 and the image data obtained in step S13 are registered as a reservation job in the reservation job region (step S203), and the processing ends. When the control section 110 judges that the first fixing unit 631 which is a general fixing unit is attached to the image forming apparatus 1 (step S202; NO), the setting information temporarily stored in the RAM 122 and the image data obtained in step S13 are registered as a temporary-stored job in the temporary-stored job region of the RAM 122 (step S204), and the processing ends. That is, when the newly input job is an envelope job and when the fixing unit attached now is a general fixing unit, the newly input job is stored temporarily and not printed until another printing instruction is instructed.

On the other hand, when the control section 110 judges that the job registering as the reservation job is not an envelope job (step S201; NO), the control section 110 judges whether the second fixing unit 632 which is an envelope fixing unit is attached to the image forming apparatus 1 (step S205). When the control section 110 judges that the second fixing unit 632 is attached to the image forming apparatus 1 (step S205; YES), the setting information temporarily stored in the RAM 122 and the image data obtained in step S13 are registered as a temporary-stored job in the temporary-stored job region of the RAM 122 (step S206), and the processing ends. When the control section 110 judges that the first fixing unit 631 is attached to the image forming apparatus 1 (step S205; NO), the setting information temporarily stored in the RAM 122 and the image data obtained in step S13 are registered as a reservation job in the reservation job region (step S207), and the processing ends.

As described above, in the registering of a reservation job, the control section 110 judges whether a newly input job can be printed using the fixing unit 63 attached to the image forming apparatus 1. When the newly input job cannot be printed, the job is not registered as a reservation job which can be executed immediately, but registered as a temporary-stored job.

When the registering of the reservation job ends, the processing returns to S1 in FIG. 3. The registering of a new job is executed repeatedly until a shift from the copy mode to another mode is instructed.

[Operating of Stored Jobs]

Operating of the stored jobs is described below.

Figure 12A:
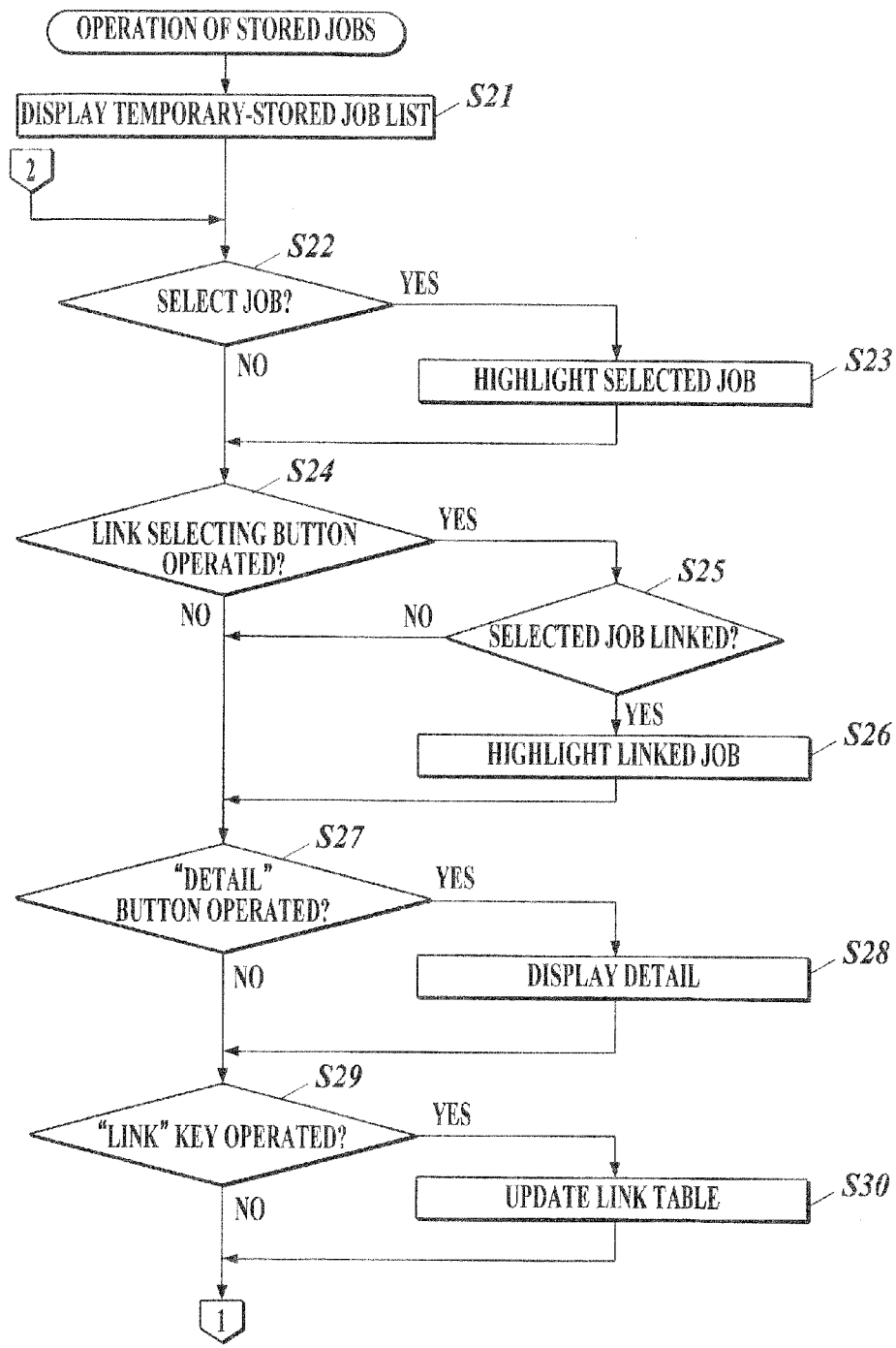
FIG. 12A is a flowchart illustrating an operation of stored jobs, the operation executed by the control section of FIG. 1.
Figure 12B:
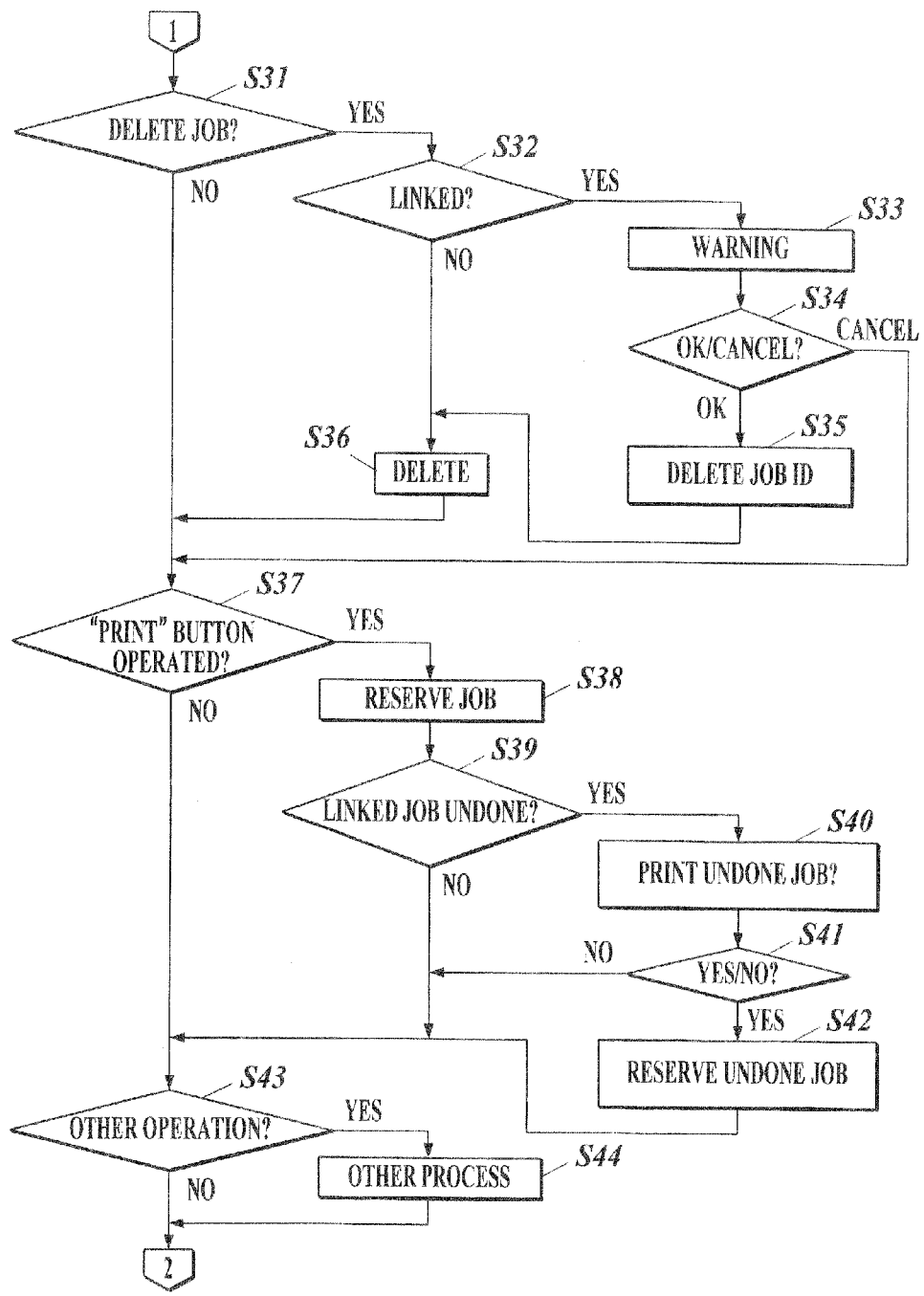
FIG. 12B is a flowchart illustrating an operation of stored jobs, the operation executed by the control section of FIG. 1.

FIG. 12A and FIG. 12B show a flowchart of operation of the stored jobs. The operation is executed by the control section 110 in cooperation with a program stored in the non-volatile memory 121, in response to the operation with the operation section 32 on the temporary-stored job list screen.

First, display section 31 displays a temporary-stored job list screen 313 (step S21).

Figure 13A:
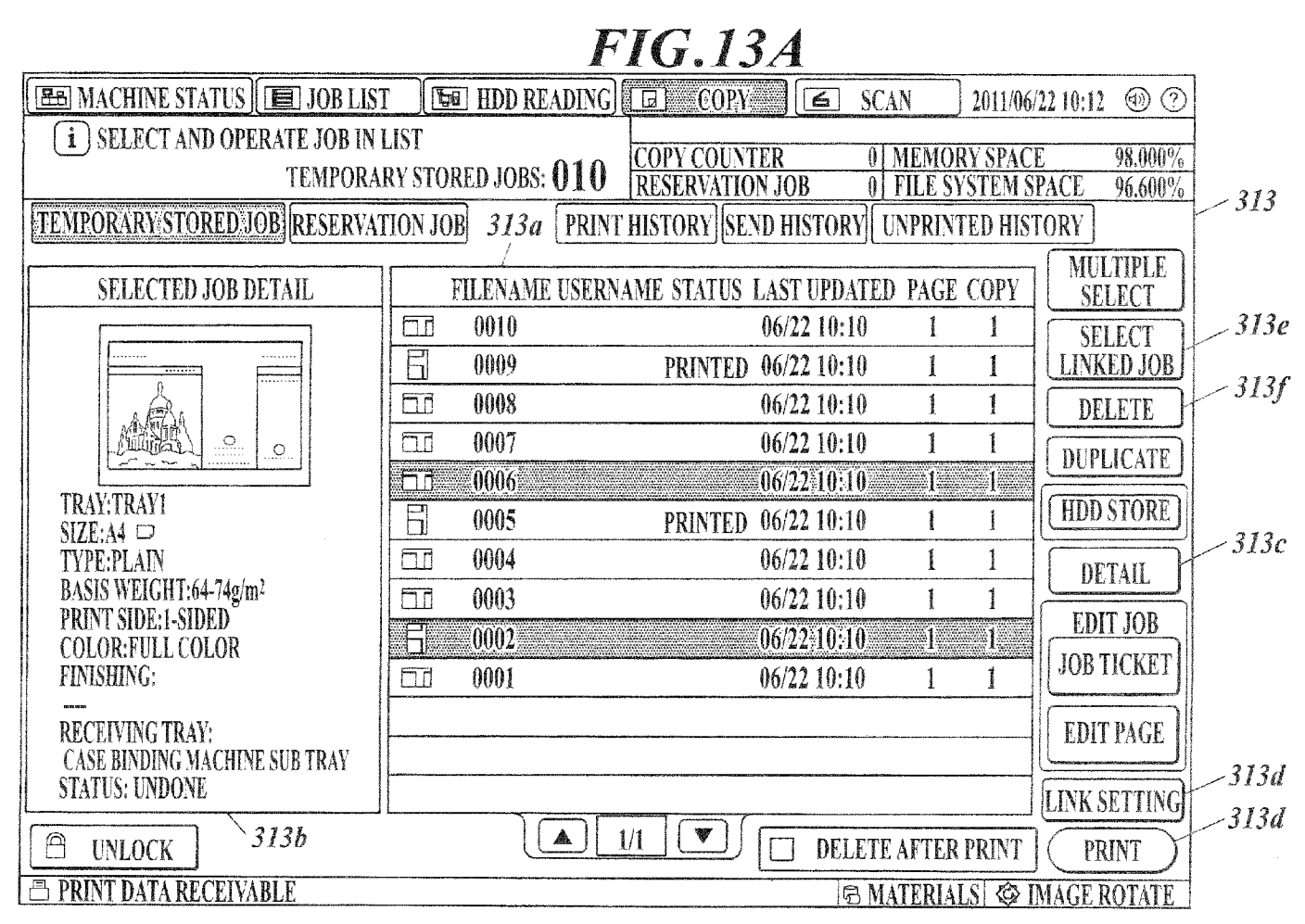

FIG. 13A shows an example of the temporary-stored job list screen 313. As shown in FIG. 13A, the temporary-stored job list screen 313 has a job list column 313a, a selected job detail column 313b, a detail displaying button 313c, a link setting key 313d as is the temporary-stored job list screen 312. In addition, the temporary-stored job list screen 313 has a link job selecting button 313e, a deleting button 313f, an outputting button 313g, and the like.

The link job selecting button 313e is a button for shifting a job which can be linked to the selected job to the selected state. The deleting button 313f is a button for instructing to delete the selected job. The outputting button 313g is a button for instructing to execute the printing of the selected job.

Next, the control section 110 judges whether a job is selected from the job list column 312a with the operation section 32 (step S22). When the control section 110 judges that a job is not selected (step S22; NO), the processing moves to S24.

On the other hand, when the control section 110 judges that a job is selected (step S22; YES), the selected job is displayed in the selected state (highlighted) (step S23), the processing moves to S24. When a job already displayed in the selected state is selected in step S23, the job shifts to a non-selected state.

The control section 110 judges whether the link job selecting button 313e is operated with the operation section 32 in step S24. When the control section 110 judges that the link job selecting button 313e is not operated (step S24; NO), the processing moves to S27.

On the other hand, when the control section 110 judges that the link job selecting button 313e is operated (step S24; YES), the control section 110 refers to the link table 122a and judges whether the selected job has a linked job (step S25). When the control section 110 judges that the selected job is not linked to another job (step S25; NO), the processing moves to S27. When the control section 110 judges that the selected job has a linked job (step S25; YES), the job linked to the selected job shifts to the selected state (step S26), and the processing moves to S27. When several jobs are selected, each job linked to the selected jobs shift to the selected state. Thus, the user can easily identify the jobs linked to the selected jobs.

Figure 13B:
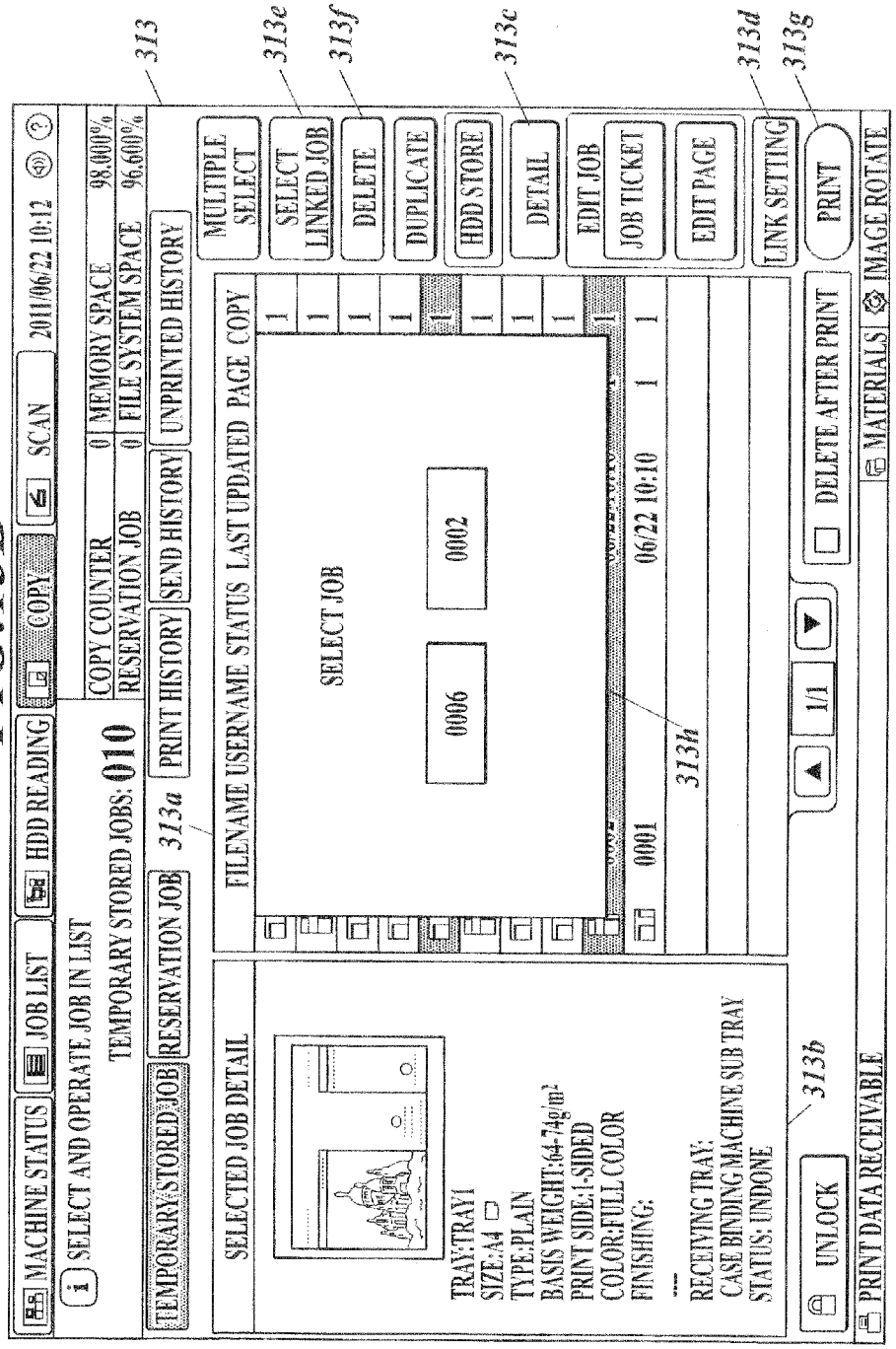
FIG. 13B is an example of a pop-up window inquiring which job is displayed in detail when a detailed screen operation is performed at a step S27 of FIG. 12A.

The control section 110 judges whether the detail displaying button 313c is operated with the operation section 32 (step S27). When the control section 110 judges that the detail displaying button 313c is not operated (step S27; NO), the processing moves to S29. When the control section 110 judges that the detail displaying button 313c is operated (step S27; YES), details of the selected job such as the setting of the selected job, page layout, printing status are displayed in the selected job detail column 313b (step S28), and the processing moves to S29. When several jobs are selected, a pop-up window 313h displaying the JOB IDs of the selected jobs is displayed in the temporary-stored job list screen 313 as illustrated in FIG. 13b. When one of the JOB IDs is selected, a job detail of the selected JOB ID is displayed on the selected job detail column 313b.

The control section 110 judges whether the link setting key 313d is operated with the operation section 32 (step S29). When the control section 110 judges that the link setting key 313d is not operated (step S29; NO), the processing moves to S31. When the control section 110 judges that the link setting key 313d is operated (step S29; YES), the control section 110 updates link information in the link table 122a (step S30), and the processing moves to S31. When a new link is set to a job in step S30, other links previously set to the job are reset, and the link table 122a is renewed as a new link setting instructed in the above operation. When links are reset, jobs which are already printed may be deleted.

Preferably, when the control section 110 judges that the link setting key 313d is operated (step S29; YES), the control section 110 judges whether an envelope job is linked to a content job. When the envelope job is linked to the content job, preferably the control section 110 executes coupling of copies of the envelope job and copies of the content job as shown in FIG. 8.

The control section 110 judges whether the deleting button 313f is operated with the operation section 32 (step S31). When the control section 110 judges that the deleting button 313f is not operated (step S31; NO), the processing moves to S37.

On the other hand, when the control section 110 judges that the deleting button 313f is operated (step S31; YES), the control section 110 refers to the link table 122a and judges whether a link is previously set to the selected job (step S32). When the control section 110 judges that no link is set to the selected job (step S32; NO), the selected job is deleted from the temporary-stored job region of the RAM 122 (step S36), and the processing moves to S37. When the control section 110 judges that a link is previously set to the selected job (step S32; YES), the display section 31 displays a pop-up window warning that a link is set to the selected job (step S33). The pop-up window displays: a message such as "A link is set to the selected job. Delete the job?"; "OK" button; and "Cancel" button. When "OK" button in the window is operated with the operation section 32 (step S34; OK), the JOB ID of the selected job is deleted from the link table 122a (step S35), the selected job is deleted from the temporary-stored job region of the RAM 122 (step S36), and the processing moves to S37. That is, a record of information of links to the selected job is deleted and JOB IDs of the selected jobs are deleted from "linked jobs" column of the other jobs in the link table 122a. When "Cancel" button in the window is operated with the operation section 32 (step S34; Cancel), the processing moves to S37.

The control section 110 judges whether the outputting button 313g is operated with the operation section 32 (step S37). When the control section 110 judges that the outputting button 313g is not operated (step S37; NO), the processing moves to S43.

On the other hand, when the control section 110 judges that the outputting button 313g is operated (step S37; YES), the selected job is registered to the reservation job region of the RAM 122 (step S38). In step S38, the control section 110 preferably executes the same judge as the registering of the reservation job showing in FIG. 11 and registers the selected job. That is, when an envelope job is selected and the fixing unit 63 attached to the image forming apparatus 1 is the second fixing unit 632, the selected job is registered to the reservation job region of the RAM 122. When the envelope job is selected and the fixing unit 63 attached to the image forming apparatus 1 is the first fixing unit 631, the selected job is not registered to the reservation job region. When a job other than the envelope job is selected and the fixing unit 63 attached to the image forming apparatus 1 is the first fixing unit 631, the selected job is registered to the reservation job region of the RAM 122. When the job other than the envelope job is selected and the fixing unit 63 attached to the image forming apparatus 1 is the second fixing unit 632, the selected job is not registered to the reservation job region. When the selected job is not registered to the reservation job region, preferably the display section 31 displays a warning window instructing to change the fixing unit. When the selected job is registered to the reservation job region, the job is deleted from the temporary-stored job region.

Next, the control section 110 refers to the link table 122a and judges whether a linked job which is not printed exists (step S39). When the control section 110 judges that an undone linked job does not exist (step S39; NO), the processing moves to S43. When the control section 110 judges that the undone linked job exists (step S39; YES), the display section 31 displays a pop-up window questioning whether the undone linked job should be printed (step S40). The questioning window displays: a message such as "Undone linked job exists. Print the undone job?"; "Yes" button; and "No" button. When the "No" button of the window is operated with the operation section 32 (step S41; NO), the processing moves to S43. When the "Yes" button of the window is operated with the operation section 32 (step S41; YES), the undone linked job is registered to the reservation job region of the RAM 122 (step S42), and the processing moves to S43. When the job is registered to the reservation job region, the job is deleted from the temporary-stored job region.

In step S43, the control section 110 judges whether the other operation is performed on the temporary-stored job display 133 with the operation section 32. When the control section 110 judges that the other operation is not performed (step S43; NO), the processing returns to S22. When the control section 110 judges that the other operation is performed (step S43; YES), the control section 110 executes processings in response to the performed operation (step S44), and the processing returns to S22.

The operation of the stored jobs is executed repeatedly until a shift from the stored job list screen 133 to another screen is instructed.

[Printing]

Printing of the job registered to the reservation job region is described below.

Figure 14:
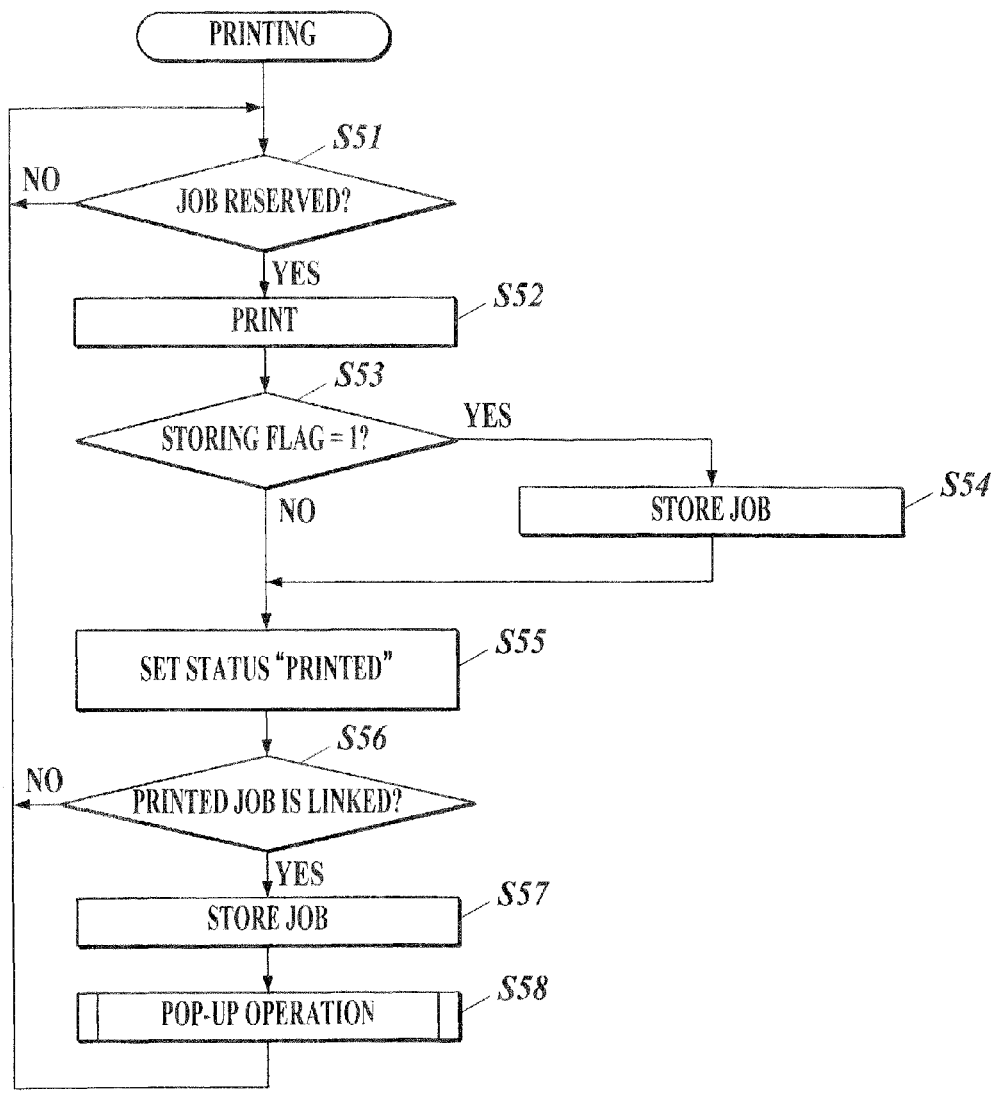
FIG. 14 is a flowchart illustrating a printing executed by the control section of FIG. 1.

FIG. 14 shows a flowchart of the printing. The printing is executed by the control section 110 in cooperation with a program stored in the non-volatile memory 121.

First, the control section 110 refers to the reservation job region of the RAM 122 and judges whether the reservation job exists (step S51). When the control section 110 judges that the reservation job exists (step S51; YES), the print section 40 executes printing based on the job (step S52).

Next, the control section 110 judges whether the storing flag of the printed job is set to 1 (step S53). When the control section 110 judges that the storing flag of the printed job is not set to 1 (step S53; NO), the processing moves to S55. When the control section 110 judges that the storing flag of the printed job is set to 1 (step S53; YES), the job is stored in the temporary-stored job region of the RAM 122 (step S54), and the processing moves to S55.

In step S55, the status of the printed job in the link table 122a is set to "printed". Next, the control section 110 judges whether a link is set to the printed job (step S56). When the control section 110 judges that a link is not set to the printed job (step S56; NO), the processing returns to S51. When the control section 110 judges that a link is set to the printed job (step S56; YES), the printed job is stored in the temporary-stored job region of the RAM 122 (step S57). Next, a pop-up operation is executed as described below (step S58).

Figure 15:
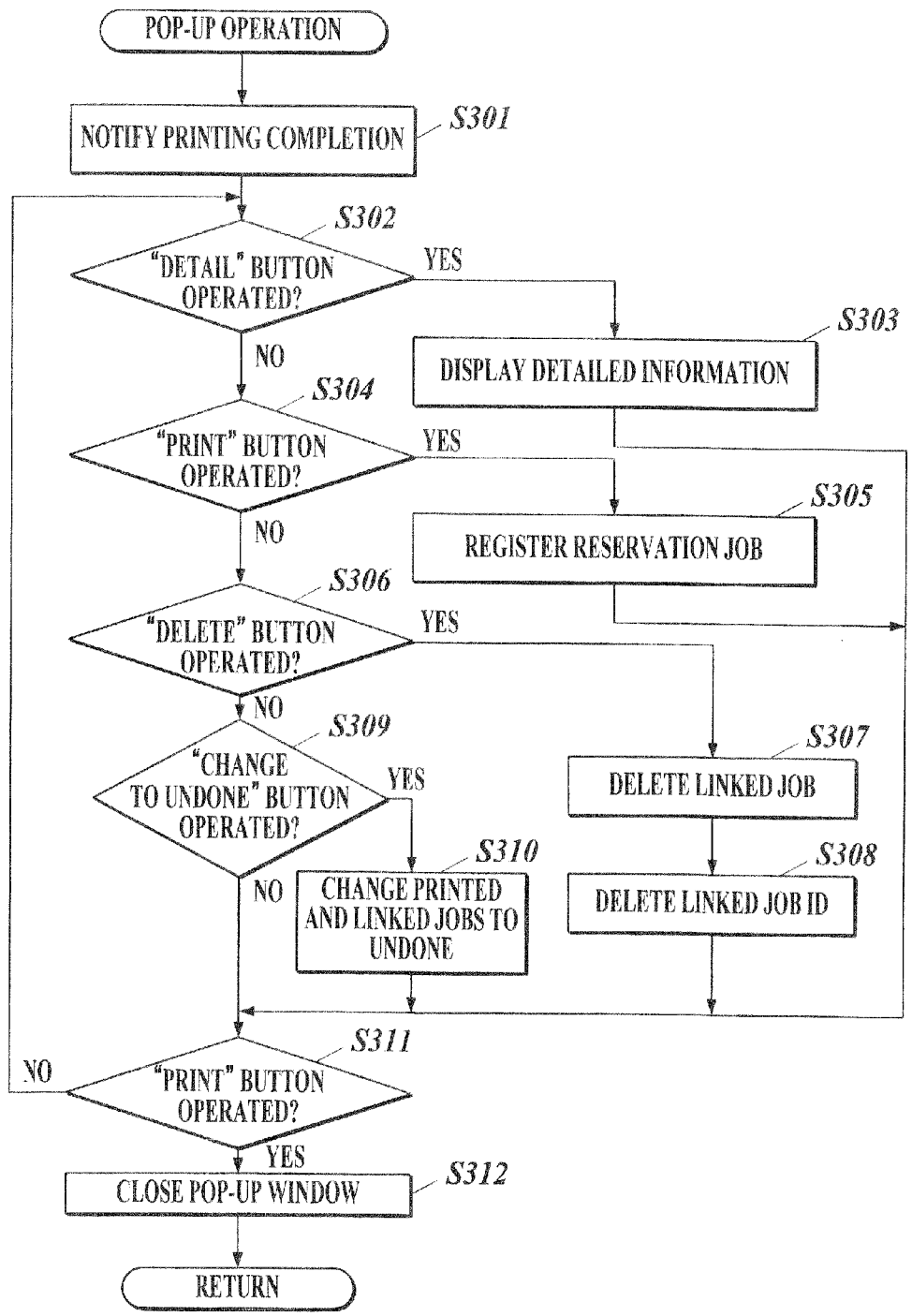
FIG. 15 is a flowchart illustrating a pop-up operation executed by the control section of FIG. 1.

FIG. 15 shows a flowchart of the pop-up operation executed in step S58. The pop-up operation is executed by the control section 110 in cooperation with a program stored in the non-volatile memory 121.

First, display section 31 displays a pop-up window 314 notifying a completion of the printing (step S301).

Figure 16:
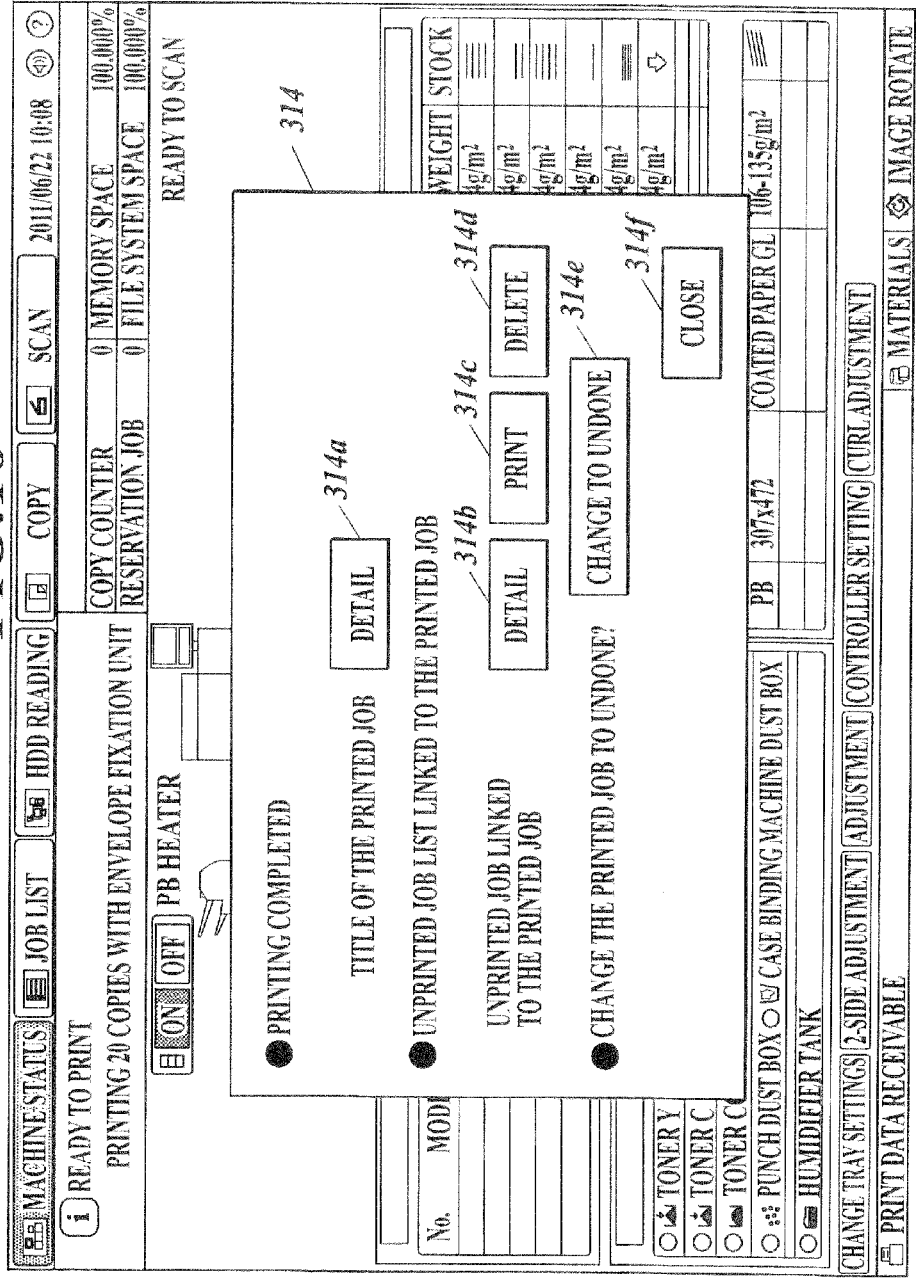
FIG. 16 is an example of a pop-up window displayed after printing.

FIG. 16 shows an example of the pop-up window 314. As shown in FIG. 16, the pop-up window 314 displays: a message such as "Printing Completed"; title of the printed job; and "Detail" button 314a. The "Detail" button 314a is a button for displaying a detail of the printed job (printing condition of the job, page layout, or the like).

Moreover, the pop-up window 314 displays: a message such as "Unprinted Job List Linked to the Printed Job"; a list of the unprinted job linked to the printed job; "Detail" button 314b; "Print" button 314c; and "Delete" button 314d. The "Detail" button 314b is a button for displaying a detail of each linked job. The "Print" button 314c is a button for printing each linked job selected from the list. The "Delete" button 314d is a button for deleting the job selected from the list.

Moreover, when all linked jobs of the printed jobs in the link table 122a have the printing status of "printed", the pop-up window 314 displays: a message such as "Change the printed job to undone?"; "Change to Undone" button 314e; and "Close" button 314f. The "Change to Undone" button 314e is a button for changing the printed job to an undone job. The "Close" button 314f is a button for closing the pop-up window 314.

Next, the control section 110 judges whether one of the "Detail" button 314a and the "Detail" button 314b on the pop-up window 314 is operated with the operation section 32 (step S302). When the control section 110 judges that none of the "Detail" button 314a and the "Detail" button 314b is operated (step S302; NO), the processing moves to S304. When the control section 110 judges that one of the "Detail" button 314a and the "Detail" button 314b is operated (step S302; YES), the display section 31 displays a pop-up window displaying a detailed information of the printed job (when the "Detail" button 314a is operated) or a detailed job of the selected linked job (when the "Detail" button 314b is operated) (step S303), and the processing moves to S311.

In step S304, the control section 110 judges whether the "Print" button 314c is operated with the operation section 32 (step S304). When the control section 110 judges that the "Print" button 314c is not operated (step S304; NO), the processing moves to S306.

When the control section 110 judges that the "Print" button 314c is operated (step S304; YES), the selected linked job is registered to the reservation job region of the RAM 122 (step S305), the processing moves to S311. Here, all of the jobs linked to the printed jobs may be registered to the reservation job region at one time. In step S305, the control section 110 preferably executes the same judge as the registering of the reservation job showing in FIG. 11 and registers the selected job.

That is, when an envelope job is selected and the fixing unit 63 attached to the image forming apparatus 1 is the second fixing unit 632, the selected job is registered to the reservation job region of the RAM 122. When the envelope job is selected and the fixing unit 63 attached to the image forming apparatus 1 is the first fixing unit 631, the selected job is not registered to the reservation job region. When a job other than the envelope job is selected and the fixing unit 63 attached to the image forming apparatus 1 is the first fixing unit 631, the selected job is registered to the reservation job region of the RAM 122. When the job other than the envelope job is selected and the fixing unit 63 attached to the image forming apparatus 1 is the second fixing unit 632, the selected job is not registered to the reservation job region. When the selected job is not registered to the reservation job region, preferably the display section 31 displays a warning window instructing to change the fixing unit. When the selected job is registered to the reservation job region, the job is deleted from the temporary-stored job region.

The control section 110 judges whether the "Delete" button 314d is operated with the operation section 32 in step S306. When the control section 110 judges that the "Delete" button 314d is not operated (step S306; NO), the processing moves to S309.

When the control section 110 judges that the "Delete" button 314d is operated (step S306; YES), the selected linked job is deleted from the temporary-stored job region of the RAM 122 (step S307); a record of information of links to the selected jobs (deleted jobs) is deleted; and JOB IDs of the deleted jobs are deleted from "linked jobs" column of the other jobs in the link table 122a (step S308). Next, the processing moves to S311.

In step S309, the control section 110 judges whether the "Change to Undone" button 314e is operated with the operation section 32. When the control section 110 judges that the "Change to Undone" button 314e is not operated (step S309; NO), the processing moves to S311. When the control section 110 judges that the "Change to Undone" button 314e is operated (step S309; YES), the control section 110 changes all of the printing statuses of the printed jobs and jobs linked to the printed jobs in the link table 122a to "Undone" (step S310), and the processing moves to S311.

In step S311, the control section 110 judges whether the "Close" button 314f is operated with the operation section 32 (step S311). When the control section 110 judges that the "Close" button 314f is not operated (step S311; NO), the processing returns to S302. When the control section 110 judges that the "Close" button 314f is operated (step S311; YES), the pop-up window 314 is closed (step S312), and the processing returns to step S51 of FIG. 14.

[Processing when Replacing the Fixing Unit]

Next, processings executed when replacing of fixing unit 63 is detected.

Figure 17:
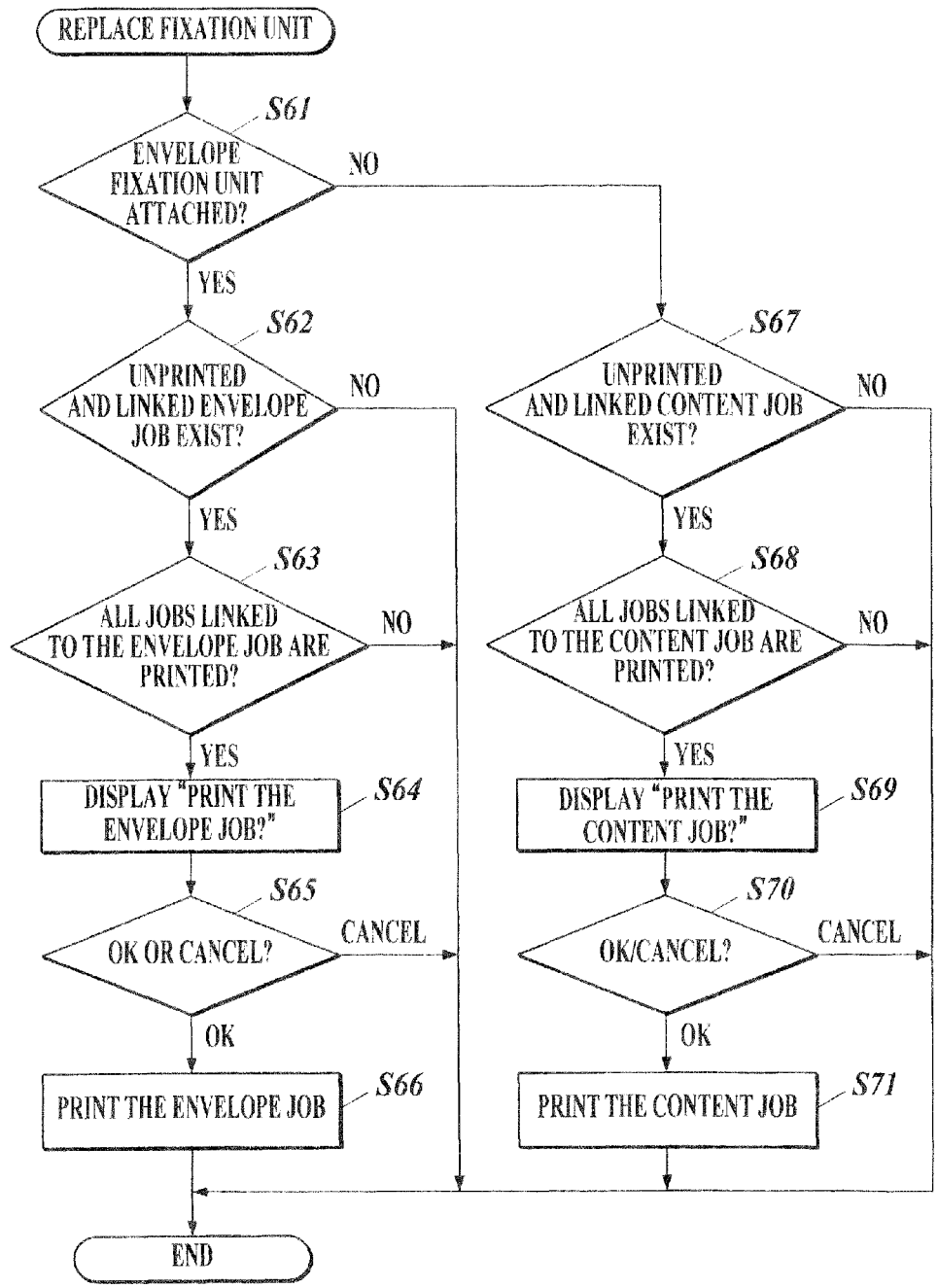
FIG. 17 is a flowchart illustrating processings executed by the control section of FIG. 1 when fixing units are replaced.

FIG. 17 shows a flowchart illustrating processings when fixing units are replaced. The processings are excited by the control section 110 in cooperation with a program stored in the non-volatile memory 121.

First, the control section 110 judges whether the second fixing unit 632 which is an envelope fixing unit is attached to the image forming apparatus 1 (step S61). When the control section 110 judges that the second fixing unit 632 is attached to the image forming apparatus 1 (step S61; YES), the control section 110 refers to the link table 122a and the setting information of the job stored in the temporary-stored job region of the RAM, and judges whether an envelope job which is not printed and which has a linked job exists (step S62). When the control section 110 judges that the envelope job which is not printed and which has a linked job does not exist (step S62; NO), the processing ends.

When the control section 110 judges that the envelope job which is not printed and which has a linked job exists (step S62; YES), the control section 110 judges whether all of the linked jobs to the envelope job are printed (step S63). When the control section 110 judges that all of the linked jobs to the envelope job are not printed, that is, an undone linked job exists (step S63; NO), the processing ends. When the control section 110 judges that all of the linked jobs to the envelope job are printed (step S63; YES), the display section 31 displays a pop-up window 315 for questioning whether the undone envelope job should be printed (step S64).

Figure 18:
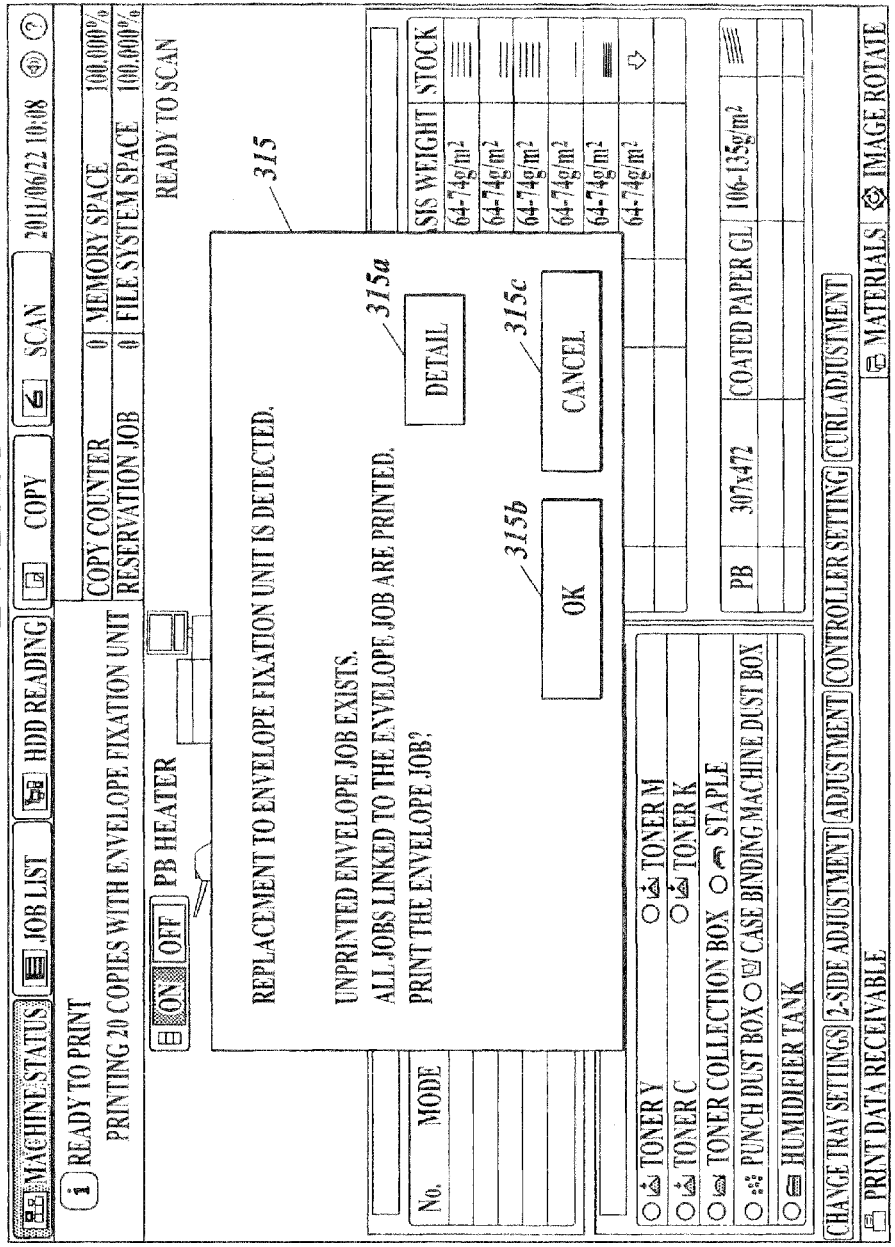
FIG. 18 is an example of an inquiry screen displayed after the replacing.

FIG. 18 illustrates an example of the pop-up window 315. As illustrated in FIG. 18, the pop-up window 315 displays: a message to notify the replacement to the envelope fixing unit such as "Replacement to envelope fixing unit is detected"; a message questioning whether undone envelope jobs having linked jobs which are all printed; "Detail" button 315a; "OK" button 315b; and "Cancel" button 315c. The "Detail" button 315a is a button for instructing to display a detail information of the undone job. The "OK" button 315b is a button for instructing to print the undone job. The "Cancel" button 315c is a button for instructing not to print the undone job. When the "Detail" button 315a is operated with the operation section 32, detail information of all of the undone envelope jobs having linked jobs which are all printed is displayed as a list.

When the "Cancel" button 315c in the pop-up window 315 is operated with the operation section 32 (step S65; Cancel), the processing ends.

When the "OK" button 315b in the pop-up window 315 is operated with the operation section 32 (step S65; OK), the control section 110 prints the undone envelope job linked to other jobs which are all printed (step S66), and the processing ends.

On the other hand, when the control section 110 judges that the second fixing unit 632 is not attached to the image forming apparatus 1, that is, the first fixing unit 631 which is a general fixing unit is attached to the image forming apparatus 1 (step S61; NO), the control section 110 refers to the link table 122a and the setting information of the job stored in the temporary-stored job region of the RAM 122, and judges whether a content job which is not printed and which has a linked job exists (step S67). When the control section 110 judges that the content job which is not printed and which has a linked job does not exist (step S67; NO), the processing ends.

When the control section 110 judges that the content job which is not printed and which has a linked job exists (step S67; YES), the control section 110 judges whether all of the linked jobs to the content job are printed (step S68). When the control section 110 judges that all of the linked jobs to the content job are not printed, that is, an undone linked job exists (step S68; NO), the processing ends. When the control section 110 judges that all of the linked jobs to the content job are printed (step S68; YES), the display section 31 displays a pop-up window for questioning whether the undone content job should be printed (step S69).

The pop-up window displayed in step 69 has the same items as the pop-up window 315 illustrated in FIG. 18. That is, a message to notify the replacement to the general fixing unit such as "Replacement to general fixing unit is detected"; a message questioning whether undone content jobs having linked jobs which are all printed; "Detail" button; "OK" button; and "Cancel" button. The "Detail" button is a button for instructing to display a detail information of the undone job. The "OK" button is a button for instructing to print the undone job. The "Cancel" button is a button for instructing not to print the undone job. When the "Detail" button is operated with the operation section 32, detail information of all of the undone content jobs having linked jobs which are all printed is displayed as a list.

When the "Cancel" button in the pop-up window displayed in step 69 is operated with the operation section 32 (step S70; Cancel), the processing ends.

When the "OK" button in the pop-up window displayed in step 69 is operated with the operation section 32 (step S70; OK), the control section 110 prints the undone content job linked to other jobs which are all printed (step S71), and the processing ends.

As described above, according to the image forming apparatus 1, the control section 110 links a new job to a job stored in the temporary-stored job region of the RAM 122 or links the jobs store in the temporary-stored job region each other, while each linked jobs are kept independently. The link table 122a stores information of the links of the jobs. The control section 110 controls a predetermined processings of the image forming apparatus 1. Thus, a number of jobs can be controlled easily as linked job.

For example, the control section 110 controls printing of all linked jobs with the print section 40 at one time. Thus, the user of the image forming apparatus 1 does not have to instruct to execute each job of a set of printings. Therefore, convenience of the image forming apparatus 1 improves and omission of printing can be prevented.

Moreover, the control section 110 controls displaying of a list of the jobs stored in the temporary-stored job region of the RAM 122 on the display section 31. When a job is selected from the displayed list, the control section 110 displays linked jobs of the selected job on the display section 31 in accordance with an operation of the operation section 32 so that the user can distinguish the linked jobs from other jobs.

Thus, the user can easily know the linked jobs of the selected job from the temporary-stored job list.

Moreover, the control section 110 controls displaying of each printing status of linked jobs linked to a job selected from the temporary-stored job list on the display section 31. Thus, the user can easily know each printing status of linked jobs linked to a job selected from the temporary-stored job list.

The control section 110 can register the linked jobs linked to the job selected from the temporary-stored job list as reservation jobs at one time in accordance with an operation of the operation section 32. The control section 110 can print the reservation jobs with the print section 40 at one time. Thus, the user of the image forming apparatus 1 does not have to instruct to execute each job of a set of printings. Therefore, convenience of the image forming apparatus 1 improves and omission of printing can be prevented.

When a new job or a stored job stored in the temporary-stored job region is printed, that is, when the printing is completed, the control section 110 displays an instruction to print a job linked to the printed job on the display section 31. Therefore, omission of printing can be prevented in case of a set of printings.

Each printing condition can be set independently to each linked job. Thus, jobs having different printing conditions can be linked.

A printing condition of one job can be coupled with a printing condition of another job linked to the one job, for example. For example, copies of an envelope job can be coupled with copies of a content job. Thus, printing conditions can be coupled with each other in several jobs which should have the same printing condition.

When an instructing to delete any one of the jobs stored in the temporary-stored job region is operated with the operation section 32, the control section 110 performs warning when the job is linked to another job. Thus, the user can confirm whether the job linked to another job should be deleted.

The image forming apparatus 1 configures different kinds of systems, the first system or the second system. The image forming apparatus 1 can change the system. The control section 110 can couple a job printable in the first system and a job printable in the second system. For example, the first system is the image forming apparatus 1 with an envelope fixing unit, and the second system is the image forming apparatus 1 with a fixing unit for sheet other than envelope. When the first system is changed to the second system, jobs printable in the second system and linked to jobs printed in the first system are displayed on the display section 31. Thus, the user can perform a set of printings which completes the printings in the second system.

The above description is one preferable embodiment of the image forming apparatus of the present invention. However, the invention is not limited to the above description.

For example, an envelope fixing unit and a fixing unit for sheets different from envelopes are described as examples of the first system and the second system in the above embodiment of the present invention. However, the invention is not limited to the above description. It is known that a phenomenon called "fixing line" happens when printing a larger sheet (for example, A3 size sheet) after printing a lot of smaller sheets (for example, A4 size sheet). That is, an edge line of the smaller sheets remains on the larger image printed on the larger sheet. To solve the problem, a fixing unit for a smaller sheet (for example, A4 size sheet) and a fixing unit for a larger sheet (for example, A3 size sheet) can be attached to the image forming apparatus 1. In case of the image forming apparatus 1 which can make up the system with the fixing unit for a larger sheet and the system with the fixing unit for a smaller sheet, the present invention can adopt to the image forming apparatus.

Storage medium of programs readable by computers such as ROM, non-volatile memory and a hard disk are used in the above description. However, the invention is not limited to the above description. Other transportable storage medium readable by computers such as CD-ROM can be used. The program data of the present invention may be provided via communication line using carrier wave.

Other details of the image forming apparatus 1 can be changed without straying from the spirit of the invention.

What is claimed is:

1. An image forming apparatus comprising:
   an operation section;
   a display section;
   a job input unit to input a job;
   a job storage to store the job input by the job input unit;
   a link setting unit to link a new job input from the job input unit and the stored job stored in the job storage, or to link each independent job stored in the job storage;
   a storage section to store link information indicating the link of jobs set by the link setting unit;
   a control section to execute predetermined processes based on the link information stored in the storage section; and
   a print section to print the job;
   wherein the control section displays a list of jobs stored in the job storage on the display section, and when one job is selected from the list with the operation section, the control section displays jobs linked to the selected job so that the jobs are distinguishable from other jobs on the display section.

2. The image forming apparatus of claim 1, wherein the storage section stores link information indicating a plurality of jobs are linked to one job.

3. The image forming apparatus of claim 1, wherein the control section executes printing the linked jobs at one time with the print section.

4. The image forming apparatus of claim 1, wherein the control section displays a printing status of the jobs linked to the selected job on the display section.

5. The image forming apparatus of claim 1, wherein the control section displays a list of jobs stored in the job storage on the display section, and prints the jobs linked to the selected job with the print section at one time in accordance with an operation of the operation section.

6. The image forming apparatus of claim 1, wherein the control section displays an instruction to print jobs linked to a new job or the stored job on the display section when the new job or the stored job is printed.

7. The image forming apparatus of claim 1, wherein the control section performs warning when an instruction to delete any job stored in the job storage and linked to another job is input with the operation section.

8. An image forming apparatus comprising:
   a job input unit to input a job;
   a job storage to store the job input by the job input unit;
   a link setting unit to link a new job input from the job input unit and the stored job stored in the job storage, or to link each independent job stored in the job storage;
   a storage section to store link information indicating the link of jobs set by the link setting unit;
   a control section to execute predetermined processes based on the link information stored in the storage section; and
   a print section to print the job;
   wherein the image forming apparatus configures a first system or a second system different from the first system, and the link setting unit links a job printable in the first system and a job printable in the second system.

9. The image forming apparatus of claim 8, wherein the control section displays an instruction to print jobs linked to a job printed in the first system and printable in the second system on the display section when the first system is changed to the second system.

10. The image forming apparatus of claim 8, wherein the first system uses a fixing unit for envelopes and the second system uses a fixing unit for sheets other than envelopes.

11. The image forming apparatus of claim 10, further comprising a coupling section to adjust copies of a content job printing documents inserted in envelopes to copies of an envelope job printing the envelopes.

* * * * *